(12) United States Patent
Bannasch et al.

(10) Patent No.: US 6,985,749 B2
(45) Date of Patent: Jan. 10, 2006

(54) METHOD AND DEVICES FOR TRANSMITTING AND RECEIVING INFORMATION

(76) Inventors: Rudolf Bannasch, Orankestrasse 55, Berlin D-13053 (DE); Konstantin Kebkal, Oberfeidstrasse 111, WEN 24.11.00.25, Berlin, D-12683 (DE)

( * ) Notice: Subject to any disclaimer, the term of this patent is extended or adjusted under 35 U.S.C. 154(b) by 674 days.

(21) Appl. No.: 10/168,489

(22) PCT Filed: Dec. 20, 2000

(86) PCT No.: PCT/EP00/13033

§ 371 (c)(1),
(2), (4) Date: Jul. 10, 2002

(87) PCT Pub. No.: WO01/47203

PCT Pub. Date: Jun. 28, 2001

(65) Prior Publication Data

US 2003/0022651 A1    Jan. 30, 2003

(30) Foreign Application Priority Data

Dec. 21, 1999 (DE) .................. 199 61 777

(51) Int. Cl.
*H04B 15/00* (2006.01)

(52) U.S. Cl. .............. 455/506; 455/63.1; 455/65; 455/296

(58) Field of Classification Search ........... 455/506, 455/501, 65, 63.1, 114.2, 278.1, 296, 67.13, 455/283, 307

See application file for complete search history.

(56) References Cited

U.S. PATENT DOCUMENTS

| 3,493,865 | A   |   | 2/1970  | Miller ................... 325/30      |
| 5,070,500 | A   |   | 12/1991 | Horinouchi et al. ....... 370/69.1    |
| 5,126,998 | A   | * | 6/1992  | Stem, Jr. ............... 370/204      |
| 5,278,862 | A   |   | 1/1994  | Vander Mey ............ 375/1          |
| 5,440,275 | A   |   | 8/1995  | Erb et al. ............... 331/4       |
| 5,671,236 | A   | * | 9/1997  | Denissen et al. ........ 714/781       |
| 5,748,670 | A   | * | 5/1998  | Zastrow ................. 375/139       |
| 5,920,874 | A   | * | 7/1999  | Mons .................... 707/205       |
| 6,047,023 | A   |   | 4/2000  | Arnstein ............... 375/229        |
| 6,049,563 | A   |   | 4/2000  | Matsui .................. 375/204        |
| 6,256,477 | B1  | * | 7/2001  | Eidson et al. ......... 455/63.3        |

(Continued)

FOREIGN PATENT DOCUMENTS

DE        195 27 325 A1      7/1995

(Continued)

OTHER PUBLICATIONS

K. Lange and K. H. Löcherer, *Taschenbuch der Hochfrequenztechnik Grundlagen, Komponenten, Systeme* 1992, pp. H19-H22, with partial English translation.

(Continued)

*Primary Examiner*—Sonny Trinh
(74) *Attorney, Agent, or Firm*—DLA Piper Rudnick Gray Cary US LLP

(57) ABSTRACT

Methods and devices for sending, transmitting and/or receiving information by means of waves, in which an information signal of a carrier wave is impressed, whose frequency is continuously changed to form at least one carrier sweep in a predetermined time interval and in which the information signal is filtered to separate multipath components after being received in the frequency range or is cleaned of noise portions and then evaluated with respect to the information-bearing signal parameters.

45 Claims, 27 Drawing Sheets

U.S. PATENT DOCUMENTS

| | | | |
|---|---|---|---|
| 6,686,879 B2* | 2/2004 | Shattil | 342/367 |
| 6,876,672 B1* | 4/2005 | Castelain | 370/483 |
| 2002/0034191 A1* | 3/2002 | Shattil | 370/464 |
| 2002/0122398 A1* | 9/2002 | Jou | 370/335 |
| 2003/0137955 A1* | 7/2003 | Kim et al. | 370/332 |
| 2005/0036563 A1* | 2/2005 | Suzuki et al. | 375/260 |
| 2005/0084035 A1* | 4/2005 | Kim et al. | 375/295 |

FOREIGN PATENT DOCUMENTS

| | | |
|---|---|---|
| EP | 0 942 538 A | 3/1999 |
| WO | WO 99/63501 | 12/1999 |
| WO | WO 00-11817 | 3/2000 |

OTHER PUBLICATIONS

Oliver R. Hinton, G. Stuart Howe, Alan E. Adams, Paddy Tarbit, and Bayan Sharif, *Performance of Stochastic Gradient Adaptive Beamformer for Sub-Sea Acoustic Communications*, Signal Processing VII: Theories and Applications, European Association for Signal Processing, 1994, 1540-43.
Hinton, O.R., et al. In "Signal processing VII: Theories and applications", European Association for Signal Processing, 1994: pp. 1540-1543. M. Holt, C. Cowan, P. Grant, W. Sandham (eds.).

Meineke; Gundlach: Taschenbuch der Hochfrequenztechnik, Springer-Verlag, Berlin, Heidelberg, New York . . . , 7. Aufl., 1992: H 21.

Hill W. et al.: "Deep-ocean Tests of an Acoustic Modem Insensitive to Multipath Distortion"; Proceedings of The Oceans Conference, US, New York, IEEE, Bd. CONF. 13, Oct. 31, 1998, pp. 275-282.

Kim J. et al: "Coded Multiple Chirp Spread Spectrum System and Overlay Service" Proceedings of the Twentieth Southeastern Symposium on System Theory (Cat. No. 88CH2553-6), Charlotte, NC, USA, 20-22, Mar. 1988, pp. 336-341.

Patent Abstracts of Japan, vol. 1998, No1. 10, Aug. 31, 1998—JP10 126382 A (NEC CORP), May 15, 1998.

Kebkal K. G. et al.: "Implementation of a Sweep-Spread Function for Communication Over Underwater Acoustic Channels", Oceans 2000 MTS/IEEE Conference Proceedings, Providence, RI, USA, Sep. 11-14, 2000, vol. 3, pp. 1829-1838.

* cited by examiner

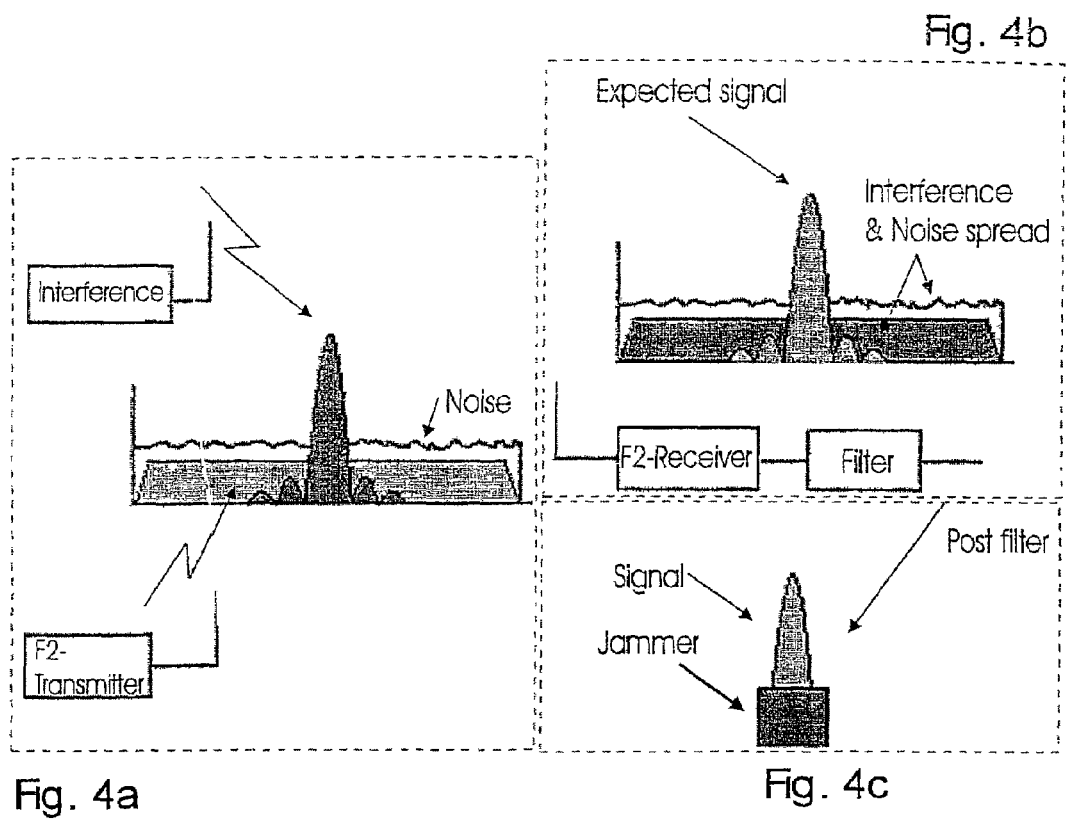

METHOD AND DEVICES FOR TRANSMITTING AND RECEIVING INFORMATION

The present invention relates to methods and devices for sending, transmitting and/or receiving information.

Rigidly fixed carrier frequencies are generally utilised for information transmission by means of waves, whereby the quality and speed of transmission is frequently impaired by interference in the transmission path. Real transmission channels can be designed very differently, and have different transmission properties, to which linear and non-linear distortions, time-constant and time-variable influences and additional interference such as noise ("noise"), influences of extraneous signals and so on can contribute. In multi-carrier systems and with transmission via memory-encumbered transmission channels the intersymbol interference (ISI) constitutes a particular problem area. The transmission properties thus result from a myriad of different effects and mechanisms which can work together in many ways.

A complex problem is created in particular by the (often time-variable) propagation on multiple paths ("multipath propagation"). This occurs for example in transmission via inhomogeneous media, in structured transmission spaces etc., in which the sent signal can be reflected by diverse contact surfaces and/or bent or scattered at the edges. The signal then not only reaches the direct communication channel (direct path), but at the same time or chronologically offset ("time delay spread" or overall "delay spread") also reaches the receiver via various bypasses (multiple receiving) with different attenuation. Apart from the differing length the individual paths can, due to their respective geometry and/or individual physical nature impress the relevant signal portions with different changes (different attenuation, non-deterministic and/or deterministic internal phase shifts and the like). These individual portions are designated as multipath components ("multipath arrivals", echoes). Each of these multipath components thus contributes its own history to the receiver, where they overlap. Such overlapping of the multipath components can lead to distortions which are difficult to predetermine locally and in time, fluctuations in amplitude and phase shifts in the receiving area (fading), and in the most unfavourable case also to deletion of the signal. This effect acts disadvantageously in particular also in time-variable transmission conditions as well as when using mobile send and receive systems. Here fading is often frequency-selective and time-selective, and the transmission function mostly cannot be determined deterministically.

In communication engineering there are countless methods known by means of which the attempt is made to minimise and/or to compensate the aforementioned interference at the receiving end. There are three main categories from the extensive catalogue of possibilities: antenna systems, receiver-side signal processing by means of equalisers, and special modulation methods.

Insofar as transmission conditions or system requisites allow, the problem of multipath propagation via beam radio and/or angle-selective receiving antennae can be toned down. With directional transmission the attempt is made to stimulate according to possibility only one specific, typically the direct path, on which the sending energy is then concentrated. With directional receiving by contrast the attempt is made to fade out undesired multipath sections or by means of a plurality of specially connected receiving elements to superpose them such that they cancel each other out (in other terms the energy of the relevant signal portions is destroyed) and only one multipath component of the user signal remains at the most. This signal content is correspondingly increased. By scanning the receiving signal at several spatial points simultaneously an antenna gain can be made. The advantages and limits of the receiver-side "beamforming" can be illustrated for example by way of acoustic data transmission under water. Clear improvements to receiver results were able to be made over short distances here. In addition the receiver was equipped with an array of receiving elements, which enables via time displacement switches narrowing and alignment of the receiving angle and thus to a certain extent focussing of specific multipath arrivals [e.g. Hinton, O. R. et al.: Performance of a stochastic gradient adaptive beamformer for sub-sea acoustic communication. signal processing VII: Theories and applications M. Holt, C. Cowan, P. Grant, W. Sandham (eds.), European Association for signal Processing, 1994: pp. 1540–1543.]. Based on the angle ratios this works only with a sufficient low-frequency coverage ratio, that is, as a rule only over shorter distances and additionally presupposes sufficiently stable properties of the transmission channel. For many applications (mobile radio etc.) direction-dependent send or receive systems are already barely practicable due to size and weight, or also as a basic principle do not achieve their goal. Here dependency on direction would often even hinder application. On the contrary, omnidirectionality of the senders and/or receivers is the aim. Compact antennae must be restricted more or less to a spatial point.

A further possibility of interference cleaning in transmission is in signal-technical processing of the receiving signals ("signal processing") in the receiver.

Generally, this develops into more and more complex preparation processes with expensive equalisers ("equaliser"), PLL and complicated correction algorithms which can be converted better and better nowadays thanks to DSP technology. The attempt is made to combat the multipath problem in particular by adaptive feed forward equalising. Transversal filters, in which the transmission properties of the digital channel are estimated with correlation analysis of known signal elements, are used to equalise echoes, for example. In addition, due to a training sequence a conjugate complex signal is usually formed and folded as inverse transmission function of the channel for equalising with the subsequent information-modulated signal sequences. In adaptive systems the equaliser is adjusted in feed forward equalisation ("feed forward equalisation, FFE"). All these methods work in the time domain ("time domain"). The result adaptive equalisation for digital channels with time-variable frequency distortions is practically impossible in this way. [Meineke; Gundlach: Handbook of High-Frequency Technology, Springer-Verlag, Berlin, Heidelberg, New York, 7th edition, 1992: volume 21.]

In recent times various methods have become known for solving this problem by different combinations of FFE, DFE ("decision feedback equaliser") and/or PLL (phase-locked loop). Despite the currently immense structural and processing expenditure the results to date are still less than satisfactory. The adaptive follow-up of the equalisers does not succeed or not quickly enough and/or not precisely enough, and S/N losses during equalisation are accordingly unavoidable.

Another known method for improving the transmission results in a noisy ambiance as well as in—as a result of multipath propagation, multiple access etc.—intersymbol interference conditions occurring consists of using multiple modulations. In this connection in particular the methods for signal spreading (spread spectrum techniques) are significant, wherein the modulated signal is spread over a wide frequency band. Here the term "signal spread" or "spread spectrum" (SS) does not refer to the information to be transmitted, but to the carrier structure. Due to the large bandwidth of the send signal transmission channels with comparatively poor signal-to-noise ratio can also be covered by means of spread spectrum systems. Essential system properties are the type and method of band spreading, the transmission of the spread signal and the inverse transformation of the spread spectrum in the desired original information bandwidth. Depending on use three fundamental modulation methods are used: Direct Sequence modulation (DS) also known as "pseudonoise method" (PN), frequency hopping modulation (FH) and CHIRP modulation.

Known advantages of the SS methods are: selective addressing option, multiple access by code multiplex, message screening, increased interference insensitivity, minimal spectral power density for signal or interception protection, adaptability to high-resolution range measuring methods and the like. The disadvantages are inter alia in the increased system requirements and from time to time the synchronisation of sender and receiver encounters difficulties. Distortions due to multipath propagations can very clearly be reduced, though they always incorporate another problem.

In the present context in particular pulsed FM or chirped modulation (CHIRP) is of interest. It finds its chief application in radar and sonar technology, but is also used variously for communications purposes. The peculiarity is in the use of pulsed RF signals, whose carrier frequency during a defined pulsewidth is changed or swept continuously over a specific frequency range.

Chirps enable favourable energy distribution over the bandwidth, making them robust relative to interference, good recognition and improvement of the S/N ratio (signal-to-noise ratio or "signal-noise ratio"). An advantage of this transmission technology is the possibility of considerably reducing the sending power.

The send signal can be generated in various ways, for example by regulating a VCO (voltage-controlled oscillator) with a linear voltage stroke. In chirp processes essentially linear frequency-modulated (LFM) pulses are utilised. A method for linearising sweeping systems, as well as the meaning of linear chirps in particular for radar technology, for spectrum analysers and the like is described e.g. in the patent DE 195 27 325 A1. It is interesting that radar technicians apply special markers to the signals for the purposes of improving signal analysis.

When communication is being made (by means of sound, optical or HF signals) mostly uncoded chirps are used which can easily be generated by means of chirp-generating filters or frequency-dependent dispersive delay line ("dispersive delay line, DLL"). SAW ("surface acoustic wave") components are generally used as dispersion filters. This is how the chirp configuration is established structurally.

Digital data transmission by means of chirps essentially comprises binary differentiation between on and off states, whereby the on states are sent as chirps. U.S. Pat. No. 5,748,670 describes a technique according to which rising and falling chirps can still be distinguished between. For increasing the information density the amplitude and/or the phase position of the chirps can still be varied. However, this changes nothing of the principle that chirp modulation offers only minimal variation possibility of the carrier structure, which is disadvantageous in particular for multiple access in multi-user systems.

It is known that each of the desired spread spectrum methods has its specific advantages and disadvantages. They can be combined in many ways. Improved system properties can be attained by means of hybrid methods as compared to single methods, whereby the system expenditure does not necessarily have to double. The best-known hybrid systems are: Frequency Hopping/Direct Sequence FH/DS or FH/PN, Time Frequency Hopping TH/FH, Time Hopping/Direct Sequence TH/DS, Chirp/FH and Chirp-PN-PSK. The Chirp-PN-PSK systems have e.g. via PN modulation a large signal variety and via chirp modulation have minimal degradation in medium-frequency shifts e.g. via Doppler or frequency deviations between sender and receiver.

For the sake of completion it should also be mentioned that mobile radio is also experimenting with methods, in which a preamble of chirps gives precedence to the information signals modulated conventionally, whereby this "header" is supposed to facilitate synchronisation of sender and receiver. Vice versa there are also methods in which narrow-band headers are combined with constant carrier frequency with subsequent LFM sequences (timed sequencing of LFM sequences and other signal forms).

The abovementioned modulation methods refer on the whole to pulse signals and fallen in the category of non-coherent transmission methods which are particularly robust relative to interference, but therefore enable transmission at only comparatively minimal data rate. In order to fulfil the constantly growing requirements for bit rates and multi-user operation, all possibilities for improving the channel loading and data throughput must be taken into consideration. It is known that transmission speed of data can be considerably increased by using phase-coherent signal structures, which due to greater susceptibility to interference of these signals also drives the expense required for signal distribution even higher or also requires other and/or special additional measures.

It is known in technical circles that in mobile radio longer, phase-coherently modulated signals are also being experimented with, which are spread in a further modulation with LFM signals. The latter are generated by means of VCO and are transmitted and then processed without the time spread and subsequent time compression typical for chirp modulation by means of SAW filters. The LFM send signals are sent separately in succession in preset time windows without an additional header. Because in the case of this transmission method all carrier frequencies always have the same rise, the tracks lie parallel to one another, whereby the time windows have to be such a size that the tracks can partially overlap one another time-wise, but the continuous frequency bands are separated cleanly from one another. In this way at least in the HF range more complex modulation forms can also be utilised for information coding. Fading is reduced or eliminated by means of sweeps. A problem arises in this method in the process of signal generation, however.

To separate the tracks the LFM receiving signal is in the meantime transferred to a narrow frequency band with fixed frequencies and filtered. By means of the filtered signal the transmission function is estimated, the filtered signal itself is inversely transformed into the sweep form (in order to equalise it as sweep), and then finally demodulated by the sweep and forwarded for parameter analysis as a narrow-band signal.

A source for complications is that the equalisation signal is formed on the basis of a narrowband transmission signal, though structured multilayer in particular under multipath conditions (which is what is concerns in the end). In the case of multipath propagation this signal always contains an entire spectrum of separate frequencies. But no reference is made thereto. The consequence in any case with exponentiation and subsequent deracination to remove the information-bearing modulation is a frequency mishmash, from which the transmission function cannot be cleanly derived. The more multipath portions and the greater the delay spread, the more pronounced this problem becomes. In case the individual multipath portions still exhibit individual or time-variable distortions (different Doppler loadings etc.), the chaos is perfect. The equalisation function is then formed from an extremely clogged signal. This source of errors can be eliminated altogether with difficulty using the equalisers working in a time range, but the interference problem is only essentially prolonged, not solved.

With all previously known methods multipath propagation is considered to be a disadvantage, and is combated with all available signal technology means, instead of using the echoes as parallel offering of nature. But the multipath portions would have to be able to be separated from one another. With previously used LFM carrier signals the rises in frequency were too flat and the structures were altogether too inflexible to make any use of this possibility. On several occasions the use of parallel chains of equalisers was put forward to utilise two or more multipath components at the same time and thus to aim for a system gain and improved receiving results. It is not known to us whether such attempts have ever had practical application. In any case in view of the necessary expense the cost-use relation for broader applications is highly questionable.

In general, communications technology is striving to put together an image of the send signal (user signal), as uninfluenced as possible. Basically, all transmission-conditional changes are treated as interference and accordingly are to be reduced, compensated or preferably completely eliminated in the ideal case. At the same time the information, which has absorbed the send signal in the process of transfer via the transmission path, is distorted.

On the other hand signals are emitted for measuring and location purposes and the like to extract from the changes occurring in the signals information on the environment, in particular on the spatial-structural and physical nature of the transmission channel, on its profile and/or objects contained therein, for determining positions and motion parameters. For this purpose signals are used which are as a rule uncoded or provided with special markers, whereby the markers act as auxiliary means for signal distribution, and no information is in terms of communications transmission.

In patent application PCT/DE99/02628, published after the priority date of the present application (WO 00/11817), which is included completely by reference into the present patent application, a signal transmission method is described in which for the first time complex signal structures are used which utilise several frequency-modulated carrier frequencies at the same time ("frequency gradient channels"). Each of the channels is employed as reference for demodulation or decoding of the other channels (information channels). It is, however, not necessary or also disadvantageous for a few applications if at least two channels are required for information transmission, of which one is used only as a channel for a reference signal, without contributing to the transmission of information.

The object of the present invention is to provide an improved method or a suitable system for transmitting and receiving information, which is simplified in particular compared to signal transmission with several frequency gradient channels and which guarantees a high transmission quality, is robust relative to the abovementioned interference and can be adapted to different transmission conditions.

The method or system for transmitting and receiving information should enable a high bit rate in particular through improved quality of signal distribution and recognition of information-bearing signal parameters and be capable of transmitting a plurality of information signals in a given frequency band simultaneously or overlapping in time and thus e.g. better utilise the available frequency bands. In the same context a possibility for parallel use of two or more frequency bands is to be created also.

The method or system for transmitting and receiving information is also to provide in particular a variable signal generation and signal processing, which allows the signal structures to be adapted to different special tasks, the receiving signals to be evaluated according to different viewpoints, and which in particular also allows the multipath components to be processed individually, parallel or also in an overall complex in order to attain an additional gain in method for information transmission and/or to extract information from the receiving signal on the environment, which has absorbed the signal in the transmission process.

These objects are solved by a method having the characteristics of claim 1 and devices having the characteristics of claims 30, 36 or 37. Advantageous embodiments and applications of the invention are defined in the dependent claims.

The basic idea of the invention comprises providing a transmission signal exclusively in the form of a carrier wave, whose frequency is fluently changed or swept at a preset time interval in a predetermined manner and which carries an impressed information signal. With transmission of the carrier wave there is no transmission of a reference signal provided. The transmission is done free of reference components. Evaluating of the transmission signal with respect to the information-bearing signal parameters happens in and of itself, that is, exclusively on the basis of the information contained in the transmission signal. No other separately received signals are used during evaluation, therefore no reference signals also.

From the signal technology viewpoint there are two different ways of viewing this issue, both of which are embodied in the invention. For one, the continuously flowing change in frequency is viewed as a specific form of spreading an information signal, which is generally unproblematic if this information signal itself already has a carrier wave. But on the other hand it is also conceivable that the information signal contains only the presettings for the modulation of a carrier wave, for example in the form of a so-called baseband modulation, which is then directly impressed on the carrier sweep.

It is essential for the present invention that specific properties are introduced to the transmission process by the fluent changes in frequency, which can be utilised to advantage. An essential part of the process and structural technology measures of the present invention in the first instance refers to the special properties as well as the treatment, preparation or processing of the carrier frequencies designed as sweep, whereby it is significant whether and in what form these sweeps are still finely modulated in detail, insofar as the relevant modulation does not fundamentally change the characteristic of the sweeps. The following description consequently concentrates on a form of observation in which the sweeps are viewed as basic carrier elements of the signals, but where other such forms are not to be excluded.

In this description a wave, whose frequency is changed continuously and fluently in a predetermined interval, is generally designated as "sweep" or also "carrier sweep". These descriptions stand as synonyms for the terms of "gradient-carrier wave, GTW" introduced to the subsequently published patent application PCT/DE99/02628 (WO 00/11817) or the descriptions such as e.g. "swept frequency" or "swept-frequency carrier" encountered in the international technical literature. For the sake of simplicity sweep is treated as a word accepted into German, from which "sweepen [sweep]" is derived as a verb for describing the execution of a continuously flowing change in frequency (synonym e.g. for "wobbeln [sweep]") and the adjective "gesweept [swept]" is used where a continuously flowing change in frequency is occurring (for example also as synonym for "gewobbelt [swept]").

The present method, which is based on use of a carrier wave with continuously flowing changes in frequency, is here also designated as "Floating Frequency Technology" or "F2-Technology" or—following the internationally accepted terminology—"sweep Spread Technology" or "S2-Technology". The abbreviations "F2-Communication" or "S2-Communication" or "S2C" stand for use for communications purposes.

In contrast to signals with a constant carrier frequency, by means of the changes in frequency an additional variable, that is, an additional dimension is introduced, by way of which apart from an advantageous distribution of the signal energy in the spread frequency band (spread spectrum) primarily has such an effect that multipath components possibly arising in the transmission process can no longer overlap so easily. The time offset (delay spread) now constitutes as a shift in the time-frequency range, in which the relevant components lie adjacent to one another, typically parallel to one another in LFM, whereby their relative distance is a function of the run time difference and of the rise in frequency of each carrier sweep. The run time difference can barely be influenced, which is conditional on nature and in terms of process technology, but is probably the frequency stroke (rise in frequency or frequency gradient). It thus becomes clear that the configuration of the carrier sweep in the method according to the present invention can be used as an instrument, by means of which the distance or the "packing density" of the components can be influenced in the time-frequency range and the interference can be reduced or avoided.

According to the present invention the signal is transferred or transformed to another frequency form after being received, whereby the transfer to a frequency band or spectrum with carrier frequencies no longer changing over time, therefore constantly fixed is preferred. An alternative, practically more difficult to realise possibility forms e.g. filtering out of a multipath component via an immediate filter and/or subsequent multiplication, folding etc. with a special function.

The effect of the transformation preferred here is that the components shifted in the receiving signal in the time-frequency space are now arranged on separate fixed frequencies corresponding to their relative distances. A very substantial qualitative effect is achieved for the signal distribution by this surprisingly simple measure, namely that the problem of separating time-delayed signal contents from the time range (time domain) is relocated to the frequency range (frequency domain). The serious advantage is that in the frequency range there are other methods for signal generation available which mostly deliver better results and can also be realised substantially more easily.

Simple filters, for example bandpass filters (BPF) can now also suffice to separate and/or resolve diverse portions of noise in the first instance. At the same time the filter or filters can be adapted to each frequency component of interest or also to place the relevant components using appropriate measures during transformation, for example by synchronisation of an auxiliary frequency with a certain multipath component, in a predetermined filter window. In many applications most problems can be solved by means of such bandpass filtering. With the method according to the present invention there is basically the possibility of further preparing the spectral portions of the frequency-transformed receiving signal also using more complex filter systems either individually, parallel or in a block, and also if required of offsetting and then evaluating for recovery or extraction or isolation of the information-bearing signal parameters. For this the methods generally known from signal processing and those methods, which are not described here in greater detail, can be used. It is emphasised however that after the receiving signal is split into a spectrum of fixed frequencies there are substantially improved starting conditions for using these methods. In the course of arranging the multipath components on separate spectral lines any forms of interference and intermodulations are diminished or eliminated.

With methods known to date it is mostly just fading and intersymbol interference which are reported as problems to be treated. A substantial part of the complications with equalisation of signals with multipath portions results also from the individual and mostly time-variant frequency and phase equalisations, for example as a result of the different Doppler loading. The intermodulations of the diverse Doppler portions complicate the development of the transmission functions, and create extremely short coherence times. Simple equalisers are too short to be capable of setting equalisation function precisely enough, and longer equalisers are too slow-acting to be capable of following changes, that is, they break down. With the F2 method these intermodulations are avoided in the best possible way. Equalisation can be undertaken for single components, substantially simplifying the task, beneficially reducing the required procedural and equipment expense and furnishing clearly better results. A few preferred processing variants as well as method-specific further developments are described in connection with the dependent claims.

It is emphasised that the method according to the present invention incorporates the option of extracting from the receiving signal a plurality of different information or to utilise the information and/or modulations contained in the send or receive signal in different ways. It is up to the discretion of the user as to how far or in what way use is made of these possibilities.

A preferred application is sending information between sender and receiver. At the same time or also independently thereof the receiving signals can also be evaluated with respect to the changes imparted to them in the transmission path, which carry to the receiver an abundance of equally valuable information on the properties and nature of the environment. By way of example the quality of individual connection paths can be determined through analysis of the frequency spectrum of the frequency-transformed receiving signal and be considered in the transmission process (for example for improving the position of sender or receiver, focussing of antennae etc.). Further to this the skilled person can also take from the signals a plurality of other measuring values with corresponding processing. Here the sender-side modulated information signal can also be used inter alia as marker, and this support evaluation. This aspect also includes modulation forms which are particularly suited to one or both of the aforementioned aspects. Various modulation methods applicable to advantage in the method according to the present invention are mentioned within the scope of the embodiments.

The carrier wave can be formed as a sound wave in a solid, liquid or gaseous medium or as an electromagnetic wave (e.g. HF signals, light waves). The change in frequency can take place in the simplest form beneficial to many applications in a given time interval linear or according to another appropriate constant, preferably monotone, function or also e.g. according to a Gauss function. Since the width of the available or useable frequency band is generally limited, the characteristic of the change of frequency of the carrier wave must reverse at the latest at the end of the pertinent time interval (turning point) or it must be rescheduled, for example again at the starting frequency. The carrier wave is thus subdivided into various sections which are designated as sweep, or—to clearly emphasise that this relates only to the structural elements of the carrier wave (of the carrier)—as carrier sweep.

Subjects of the invention are both sending and receiving methods based on the principle explained hereinabove.

For sending the information to be transmitted is impressed on the carrier sweeps or the gradient carrier wave (GTW), that is, the pertinent signal parameters are modulated according to the coding method chosen by the user. The modulated carrier wave is designated as an F2 signal or S2 signal.

According to a preferred embodiment of the invention the carrier wave embodies a series of uniform sweeps, which can also be separated temporally from one another, if needed. The distances can be advantageous e.g. for the attenuation of multipath components connected at a later time or other channel responses (designated as reverberation in acoustic signals). The possibility of configuring the sweep distances variably can be used e.g. for breaking the information down into separate information packets. This option also provides a basis for use in multi-user systems.

According to the present invention the carrier sweeps can show a wide range of varieties and adapt flexibly to the widest range of transmission conditions and tasks. By way of example rising and falling carrier sweeps can alternate at appropriate intervals, or the sweeps can be configured such that a closed course, oscillating over the frequency band, results overall for the frequency response of the carrier wave. Multiplexing on one or more frequency bands can also be provided, in that the frequency position (starting frequency) of the carrier sweeps changes from sweep to sweep.

According to another embodiment of the invention there is provision to achieve a higher bit rate through dividing the carrier sweeps respectively into two or more modulation time pulses (MTP) of variable length, if required. According to a configuration it is not the absolute values of the signal parameters but their relative changes from modulation pulse to modulation pulse which are used for information coding, whereby greater stability of data transmission is achieved for example compared to dynamic noise.

For optimum use of a given frequency band several parallel signals (several modulated sweeps) can be transmitted, according to the present invention. In case of need this embodiment can also be utilised to the extent that instead of multi-user operation, or in combination therewith, the sweeps of one and the same F2 signal are shifted together such that they overlap temporally. It is also possible for a signal to simultaneously transmit two or more sweeps with different, for example counterrotating frequency characteristics (cross sweeps etc.), and thus to double or multiply the information rate. This variant thus contains a whole series of possibilities for augmenting the transmission rate in any given frequency band.

In a particular advantageous configuration for various applications it is provided in particular that the carrier wave is broken down into two or more sections or intervals, having different frequency characteristics. In the process at least one of these sections is designed as a sweep. This sweep can now be transmitted in a transmission sequence to temporally overlap or also simultaneously with other signal sections, for example with a frequency-offset, but otherwise identically structured carrier sweep and/or in combination with a section having constant carrier frequency and/or with one or more carrier sweeps, which exhibit another, preferably counterrotating, increase and/or also another sweep form. Even though this already results from the previous context, it should be explicitly repeated here that it is well within the capacity of the method to arrange the transmission sequences formed from two carrier sections or carrier sections inserted into one another or superposed described just as before for individual carrier elements, as a closed consequence, in different groupings or as stand-alone "packages" in a consistent frequency band or also variably in the time-frequency space.

The wealth of configuration options results from the separability of signal contents which are differently configured or sufficiently well spaced in the time-frequency range given in the method according to the present invention, including the received multipath components. These instruments can be utilised in various ways. By way of example the transmission of information can be made faster and/or more reliable by means of suitable modulations, or determining environmental parameters can also be improved. Apart from the possibility of distributing the information signal more or less evenly over the pertinent carrier sections, it can also be of advantage to encipher a symbol in two or more sections, or to incorporate the same information in several sections. In this way the likes of dropouts can be avoided, correction algorithms can be supported, markers for signal distribution can be set and/or certain sections can be prepared as reference for signal evaluation. In the latter case modulation in the sense of information transmission can be also be dispensed with for the pertinent parts, if necessary.

This variation variety of the time and frequency pattern can be put to use advantageously to distinguish, separate or analyse signals during multiple access, that is, for multi-user operation in the given frequency band.

The sweeps or carrier portions of the F2 signals are preferably configured according to a specific protocol, established both for the sender and the receiver. This protocol can for example be different for each user pair, whereby in multi-user operation in particular the danger of mutual influence of the signals is reduced on a common frequency band. If on the other hand an identical sweep configuration is used for several F2 signals in parallel operation, the transmission protocol can serve for example to bring about a suitable temporal staggering by adapting or assigning time slots (time slots). Also, operative adaptation to the respectively given transmission situation, special requirement of application or the wishes of the operators can be made. Different transmission protocols can be helpful for example for achieving a better receiving quality, for making more effective use of each frequency band, for preventing delays, for switching to another frequency band or also for reducing the risk of extraneous detection or wire tapping etc.

The methods according to the present invention in another embodiment also enable combinations with other modulation methods, already proven in practice, in particular also the well-known spread spectrum method. It can thus be advantageous for a series of applications to utilise the possibility of multiple modulation according to the direct sequence method or PN method in order to make the transmission even more insensitive to noise, to further increase the form variety, to increase the channel capacity, to further improve the possibilities for multiple access, to mask or camouflage signals or messages and the like.

The receiver according to the present invention is equipped to receive signals output by the sender, to then process and evaluate them. Evaluation according to a time and/or frequency pattern which is predetermined or agreed on in the transmission protocol enables a specific information signal to be isolated from the received spectrum and in particular also enables distributed portions to be connected appropriately in the time-frequency range. In particular in the case of multiple-modulated, for example PN-modulated, signals the pattern may comprise different part patterns which are suitable applied, in general successively. By way of advantage various noise portions are weakened or eliminated during separation or demodulation, which is generally evaluated as "emodulation gain" with respect to information transmission.

The method according to the present invention provides transferring or transforming the F2 signal after receipt into another frequency form, e.g. into a constantly fixed frequency band. This is done for example by mixing or multiplication with an artificially generated auxiliary frequency (heterodyne frequency), which displays the same frequency response as the carrier wave (GTW) of the send signal, but which is shifted parallel relative thereto so that the frequency of the carrier wave of the transformed signal remains constantly fixed. Alternatively transformation can also be carried out by means of a heterodyne frequency with counterrotating frequency characteristic with respect to the send signal, and can be shifted parallel or can also lie in the same frequency band. These variants can be advantageously combined if necessary to process more complex signal structures, for example to arrange transformed signal sections or components in different spectral ranges. Likewise it is within the scope of the method to carry out transfer in fixed frequencies in several steps, for example to improve the result iteratively or also to balance out time-variant changes of specific target components.

The frequency transformation carried out for sweep demodulation also has another advantageous effect apart from breaking down multipath components into narrowband spectral lines. This comprises now reuniting the energy of the signal components spread over the frequency band in the receiving signal in the pertinent frequency cells. In the same process narrowband noise portions, whose energy is distributed, and which are received in the receiving signal are spread. Depending on the spread selected for transmission the result of this processing step is a rise in the S/N ratio, and thus a gain in modulation or system.

With generating the auxiliary frequency if necessary a Doppler frequency shift is observed in the transmission channel.

After transfer to the other frequency form advantageous further processing in the frequency range, or if necessary filtering for separating single frequencies or cleaning out noise portions, as well as evaluation can now follow.

A basic variant provides isolating and evaluating the best suited frequency from the spectrum of single frequencies contained in the transformed signal, in particular as a result of multipath propagations. The adaptability can be determined by different criteria, for example by circuit technology presettings. Important selection criteria are especially the strength of each single frequency and/or their distance from the adjacent frequencies. In many cases the isolated frequency can be evaluated directly. In a further structural step, typically after isolation, additional filtering can be carried out in the time range, in particular by means of adaptive filters such as for example equalisers, and/or adaptive phase correction, in particular by means of PLL, for example to improve the reconstruction of the send signal and/or be better able to determine parameters. An essential advantage of the method according to the present invention is that following transfer to fixed frequencies there is compatibility with known methods and methods of signal processing, thus according to requirement almost any choice of single operations or also complex preparations, feedforward or feedback methods can be integrated, by means of which practically all signal parameters in the frequency range, time range and/or any other projection planes can be mentioned, processed or evaluated.

Analysis takes place for example for demodulating phase-modulated F2 signals by means of dissociation on auxiliary components generated on the receiver side (auxiliary fluctuations, quadrature components, PLL, FFT or a flip-flop circuit) whereby for example the phase difference between two preferably adjacent modulation time pulses is determined.

In another embodiment not only one, but two or more frequency components are isolated from the spectrum of the single frequencies contained in the transformed signal and are evaluated preferably in separate processing channels or also successively in one processing channel. The evaluation results, for example of different multipath components, can then be compared to one another or balanced. Therefore already simple steps, such as formation of the average values from the respective signal parameters, if necessary with weighting corresponding to the strength of the pertinent components, can considerably constrict the spread width of the end results, decreasing the bit error rate (BER), or also more complex modulation methods (for example phase modulations with more digital steps) can be utilised. By means of the F2 method for the first time use can be made of multipath propagation, which should be designated as "multipath gain".

A further development of the method comprises that from the spectrum of the single frequencies contained in the transformed signal two or more frequency components are isolated and shifted relative to one another and transformed in frequency such that the carrier waves are coherent, then are balanced with one another, in particular projected over one another or added, and then analysed. The advantage of this operating method is especially in the reuniting of the signal energy of the pertinent portions, so that a substantially stronger signal is available for evaluation. There is also another important effect where at the same time the noise portions of the components also are accumulated, though this does not necessarily lead to a summary increase in the noise level. Since particularly with multipath propagation each multipath component brings its own portion of noise along with it, distortion results in a corresponding evening out of the energy portions of the noise spectrum. Naturally, with the use of echoes as parallel supply of the real environment it is to be considered that the multipath components can be of varying quality, and as a rule they are also received in varying strengths. Nonetheless, with the basic principle described here, which can be further developed depending on application and refined, a considerable improvement in the S/N ratio can be again achieved and the multipath gain can be increased.

With the last-described heterodyning method an advantageous effect is that the correction parameters used for coherent adaptation of the components contain information on the spatial-structural and physical nature of the transmission channel, which is definitely already extensively processed. Further processing and evaluating for extraction of such information incorporates a design or structural possibility of the method according to the present invention.

Another design of the method, advantageous for a plurality of applications, in particular for information transmission contains the layout of the receiving page in the form of a so-called "blind receiver". A special form of signal processing is prepared for this which is designated as "blind" signal processing (English: "blind signal processing"). "Blind" in this context means that special measures for exact temporal synchronisation of sender and receiver can be dispensed with, and the receiver automatically recognises and evaluates the signal specified for him without additional measures for adapting to synchronisation. As specific feature of the F2 method in addition to an automated sweep demodulation a further option is that the diverse multipath components contained in the receiving signal are moved coherently and fully automatically and the signal energy of all components is combined in a continuous narrowband signal which is then prepared for evaluation. This basic principle can be realised variously in procedural technology terms.

A preferred embodiment, which in particular can be used advantageously with use of LFM carrier sweeps, essentially comprises three processing stages or steps which can be structured individually in any way and in the overall complex. The basic idea comprises the following features: a) projection of the receiving signal onto two different auxiliary frequencies (sweeps) to generate two separate frequency spectra with internal (that is, within the spectra) mirrored arrangement of the constant-frequent spectral elements, if necessary phase transformation of one or both spectra; b) elimination of the delay spreads using the functional connection between the run time shifts and the frequency shifts, if necessary also equalisation of individual frequency or phase distortions, for fine synchronisation of the elements in both spectra; and c) multiplication of both spectra by themselves for concentration of the signal energy of the individual elements in the frequency cell of the new central frequency and for combining the individual elements into a continuous wave with the new central frequency. After this the central frequency is filtered out and evaluated. Further details are explained hereinbelow with reference to the figures.

The abovementioned method enables maximisation of the S/N gain from the use of multipath propagation. Of considerable advantage also is that the sweep-modulated transmission signal can be reunited on the receiver side into a coherent wave. These are important requisites e.g. for the increase in transmission rate, transmission security etc., but are also used differently, for example to reduce the sending power (longer battery life, improved health tolerance and the like) required in mobile radio. The practical use is substantially simplified with the possibility of processing the signals blind. Apart from these strong merits blind processing according to the abovementioned basic idea probably also brings certain restrictions with respect to useable variety of signal form, and time and frequency pattern. Furthermore with PSK modulations for example it should be considered that with multiplication of both spectra the number of digital phase conditions resolvable on the receiver side is halved. It may not be a problem to accordingly adapt coding of the information signal. In addition, after the connection is made e.g. by means of the blind method at any time there is the possibility of synchronising sender and receiver for example "on-the-fly" and then transferring to another mode.

Another embodiment comprises adaptive measures in particular also for combinatory tasks, for example in underwater technology, in location, orientation etc. which are often at least just as important as communication. With the method according to the present invention a principal solution is found which can be out to good use in the proposed form or in a similar form in many areas of signal technology (including HF range, laser technology etc.). In particular a copy of the send signal and/or transformation of same is generated with the help of the information demodulated according to one of the abovedescribed methods on the receiver side and this artificially created signal, free of all noise, distortions and other changes occurring in the transmission channel, is balanced with the received signal and/or its processing stages to qualitatively and/or quantitatively evaluate the transmission-qualified changes and information therefrom on the environment, for example for determining positions and motion parameters, for spatial-structural and physical nature of the transmission channel, whose profile and items are contained therein etc., generally to obtain any type of information which the send signal has absorbed in the process of transmitting via the transmission path. At the same time the information signal attached to the transmission signal can be calculated selectively on the sender side or also included appropriately in the evaluation, for example as a marker.

For different applications it is an advantage for the sender to also be capable of such analysis. Accordingly, provision is made to configure the sending device such that the sender receives images reflected by the transmission channel or by contact surfaces or objects contained therein or components of the send signal, typically emitted by itself, and processes this with the original send signal for extracting information on the environment.

Furthermore, with the method according to the present invention it can be advantageously provided that the information on the respective properties and other qualities of the transmission channel, is considered during signal generation and/or signal processing, for example in order to improve or to make precise or to expand the transmission result and/or environmental analysis.

Subjects of the invention are also sending or receiving devices for carrying out signal transmission according to the present invention and systems comprising combinations of such sending or receiving devices.

The sending device comprises at least one generator device for generating carrier waves with continuously flowing changes in frequency (carrier sweeps, GTW) and accordingly at least one modulator for its modulation.

The receiving device is configured to detect signals with carrier sweeps. Its structure has a reference generator for generating at least one auxiliary signal with an artificial auxiliary frequency, at least one mixer for heterodyning the received signal with each auxiliary signal, if necessary one or more filters and at least one analysis device.

The invention has the following advantages in particular. For the first time use is made of broadband frequency channels with sweep-modulated signals, which enables additional information transfer over the existing, rigidly fixed frequency bands, without causing substantial disruption to the transmission systems based on fixed frequencies. The noise influences (transfer over a greater frequency range) are levelled out by the continuously flowing change of the carrier frequency of the F2 signals and the prerequisite for an improvement in the S/N ratio in signal preparation on the receiver side is created. The carrier wave or carrier sweeps can be modulated according to application based on digital or analog coding. In contrast to the known chirp-impulse method each of the carrier sweeps used here incorporates a relevant signal section, enabling use of phase-coherent modulation methods and thus a higher information rate.

Those advantages which are also explained in PCT/DE99/02628 (WO 00/11817) for the signal transmission described there are aimed for. Since F2 technology enables the best-possible separation and thus also separate evaluation of individual channel responses, the problems of heterodyning occurring with multipath propagation can be reduced to a minimum value and the best-possible stability of the amplitudes and phase positions are achieved in the receiving signal. There are also different possibilities by means of which use can be made even of multipath propagation. It is particularly significant that the signal energy of the multipath components can be combined time-delayed with the incoming receiver. The multipath gain thus achieved can be considered as a certain parallel to the antenna gain, which can be achieved by simultaneous scanning of the signal at several points, only that use is made here of temporal staggering of the multiple receiving (echoes) at one point. Both methods can be combined beneficially. The main point of concern of the present invention in the first instance however is preparing the equipment for a preferred compact solution.

The high quality of recognition opens up the possibility of simultaneously undertaking a substantially finer variation of individual or if necessary also several signal parameters for the purpose of information transmission. The user of F2 technology is thus free to attach the information of the carrier wave in the form of analog wave signals or also in the form of another suitable modulation curve. In this way amplitude, phase, and/or frequency modulations can be carried out individually or in suitable combinations such that discrete conditions are generated which can be utilised for digital data transmission. In the process the possibility for finer distinction of discrete conditions can be used for an increase in the bit rate. Other digital conditions can be realised also due to the variety of options for parameter variation by suitable combinations. The digital modulation form can be applied advantageously also for individual sweeps, which inter alia is also beneficial for multi-user operation.

By means of the F2 method presented here an overall more balanced receiving quality can be achieved in each sending area, whereby it might be of considerable advantage particularly for the use of mobile sending and/or receiving devices also that the fluctuations (fading) hitherto caused by interference and especially also areas with no reception are now absent.

For a series of applications it is of advantage if the F2 signals can barely be disturbed from outside in the case of correspondingly broadband configuration. For example the entire frequency range can thus hardly be blocked by noise frequencies. Furthermore it is of advantage that the energy (power spectral density) is distributed over a correspondingly broad frequency range with carrier sweeps of F2 signals. Based on the fact that each individual frequency cell thus contains less energy and is also run through quickly, on the one hand the F2 signals are more difficult to detect for outsiders (in particular if the structure of the carrier sweeps is not known to them, or if the sweep characteristic is altered in the transmission process) and on the other hand also they hardly interact with other signals which are sent for example on fixed frequencies or are likewise built as F2 signals, whose carrier sweeps have another e.g. a counterrotating frequency rise (cross sweeps etc.). In principal it seems possible to use so-called "sweep-frequency channels" (F2 channels or S2 channels), which extend all over a correspondingly broad bandwidth, in addition to the existing fixed frequency bands. Arising from the possibility of combining with other spread spectrum methods are advantageous structural variations by means of which a series of the abovementioned merits and also the spectrum of use can be further expanded.

Further details and advantages of the invention are evident from the description of the accompanying diagrams, in which:

FIGS. 1a, 1b: are graphic representations for illustrating the cycle of carrier sweeps with linear rising (a) or falling (b) frequencies;

FIGS. 2a, 2b: are graphic representations of the wave images of two F2 signal sections;

FIGS. 3a, 3b: are graphic representations with examples for heterodyning carrier waves, a carrier sweep and a constant-frequency carrier (a) two carrier sweeps with linear rising or falling frequency (b), which can belong to one information signal or also to different information signals;

FIGS. 4a, 4b, 4c: are schematic representations for illustrating the spectral energy density distribution of heterodyned signal contents as well as redeployment in connection with a frequency transformation: sweep-spread signal (F2 signal), narrowband noise signal plus noise (a) reversal of ratios as a result of transformation (b) transformed user signal plus noise portion after filtering (c);

FIG. 5: is an illustration of the breakdown of a carrier sweep into modulation time pulses;

FIG. 6: is an illustration of the structure of multiple modulation with generation of a F2 send signal, here in an example of an offset QPSK of the information signal which is modulated and filtered on an LFM carrier wave (sweep);

FIG. 7: is an example for using a frequency band with several F2 signals;

FIG. 8: is an example for a temporal arrangement of carrier sweeps of an F2 signal in a frequency band;

FIG. 9: is an illustration of the distribution of the carrier sweeps of an F2 signal on several frequency bands;

FIG. 10: is an illustration of receiver-side generation of an auxiliary frequency;

FIG. 11: is an illustration of the receiver-side projection of the carrier wave on a auxiliary frequency;

FIG. 12: is an illustration of the fine structure of a receiving signal;

FIGS. 13a, 13b: are graphic representations to illustrate spectral portions of a frequency-transformed receiving signal;

FIGS. 14a, 14b: are block diagrams of a sending device (a) or a receiving device(b) according to the present invention;

FIG. 15: is a block diagram of a receiving device according to a configuration of the invention;

FIG. 16: is a block diagram of a sending device for generating F2 signals with temporally distorted carrier waves;

FIG. 17: is a block diagram of a receiving device with separate processing channels;

FIG. 18: is a block diagram of a receiving device for combined evaluation of multipath components;

FIG. 19: is a block diagram of a receiving device for combined evaluation of multipath components with individual phase correction;

FIG. 20: is a block diagram of a receiving device with equaliser;

FIG. 21: is a block diagram of a receiving device for combined evaluation of multipath components with individual equalisation;

FIG. 22: is a block diagram of a receiving device for blind signal processing;

FIG. 23: is an illustration for projection of a receiving signal with an echo on two different auxiliary frequencies for generating two mirrored frequency spectra;

FIG. 24: is a detailed representation for projection on the upper auxiliary frequency;

FIG. 25: is a detailed representation for projection on the lower auxiliary frequency;

FIGS. 26a, 26b: are illustrations for mirror arrangement of the frequency portions in the transformed spectra as well as for correction of the time displacements by means of special filter functions;

FIGS. 27a, 27b: are illustrations of location of the frequency portions after shifting along the temporal axis;

FIG. 28: is an illustration for forming a connected wave and for concentration of the signal energy in the frequency slot of the corresponding central frequency (prior to filtering out scattered portions);

FIGS. 29a, 29b: are block diagrams of a sending device (a) or a receiving device (b) for PN modulated F2 signals;

FIG. 30: is a block diagram of a receiving device with Doppler equalisation; and FIG. 31: is a block diagram of a receiving device with integrated spectral analysis unit, in particular for "on-line" analysis of the multipath structure.

The signal transmission according to the present invention is described hereinbelow with respect to signal generation (sender-side generating of the carrier frequency and its modulation) and the receiver-side signal processing and demodulation. The physical-technical measures known as such for signal generation or gain, for digital information coding, for sending and for receiving are not illustrated in detail.

Sender-side Modulation

FIGS. 1a and 1b exemplify each individual carrier sweep with different frequency gradient which in this simplest variant is designed linear. Following FIG. 1a FIGS. 2a and 2b schematically illustrate the oscillation course for a few oscillation periods, whereby each frequency rise is identical, though the start phase differs by 180°. The adjustment of the start phase represents an example for (phase-)coding with F2 signals. Other coding possibilities are based on the amplitude and frequency modulations or combinations of all modulation types known per se.

FIGS. 3a and 3b illustrate the possibility of simultaneous transmission of a carrier sweep with an otherwise configured section of a carrier wave, whereby FIG. 4 illustrates by means of the diagrammatically illustrated spectral energy density distribution that an F2 sweep signal and a narrowband frequency component (here indicated with respect to the sweep signal as interference signal) are mutually influenced insubstantially only. Whereas in the transmission or receiving signal the narrowband component clearly stands out, and the energy of the F2 signal is distributed widely over the frequency band (FIG. 4a), the ratios (FIG. 4b) are reversed after frequency transformation by means of the sweep auxiliary frequency generated on the receiver side. As a result the energy of the previously narrowband noise signal is spread over the band, while the energy of the F2 signal is concentrated in a frequency cell, whereby this signal henceforth stands out clearly over the noise. This can now easily be filtered out and evaluated (analysed). FIG. 4c illustrates how the filtered signal still contains noise portions which can cause errors during evaluation of the transmitted information.

It should be noted that when sweep is heterodyned with an opposing sweep (not illustrated here) during transition of the first sweep into a constant frequency, the signal energy of the second sweep is spread over an even greater frequency range.

A carrier sweep can be a carrier of one or more bits or (in analog information processing) of one or more information units. For several bits or information units a carrier sweep is divided into modulation time clock pulses (MTP), as illustrated by way of example in FIG. 5. Illustrated here is the breakdown of one sweep with linear frequency increase into two pulses T1 and T2 each of equal length of pulse time $t_{T1}$ or $t_{T2}$. Breaking down the carrier sweeps into two or more MTP each can achieve a higher bit rate.

Subdividing into modulation time pulses, in particular with transmission of digital information, serves to separate the bits or to rediscover them. If e.g. two zeroes are transmitted successively, then they can be distinguished as two bits by the modulation time pulses. With large pulses counts (e.g. 10 pulses per sweep) there are advantageously especially high bit rates.

The introduction of modulation time pulses points to a significant difference compared to the abovementioned conventional use of chirps in signal transmission. According to the present invention the sweeps are not simply just switched on and off, rather modulated pulsed.

The MTP pulse times can be altered continuously or gradually depending on application with respect to the frequency of the carrier wave. At the same time it is assumed that for demodulation of each of the F2 signals only a certain number of oscillation periods of the carrier wave is necessary. But because the number of oscillation periods per time unit is constantly changing in the sweeps, if necessary a considerable rise in the bit rate can be achieved, in that the modulations pulse times are reduced to the minimum required measure, that is, adapted to the current respective frequency level of the carrier sweeps.

Another possibility for increasing the bit rate is also in the application of more complex modulation methods for information coding. FIG. 6 illustrates the structure of multiple modulation with generation of an F2 send signal as an example of an offset QPSK of the information signal known per se and subsequent modulation with a carrier sweep, with only the send signal shown. The unnecessary side band is filtered out. In this illustration the information signal itself has a carrier wave, which is then modulated with the sweep or on the sweep. The result is identical in both cases. In the present method it is preferred, however, as mentioned at the outset, to regard the sweep as a carrier of the total signal. In this connection it should yet again be pointed out that formation of F2 signals does not absolutely presuppose that the information signal has a self-sufficient carrier. It is thoroughly possible to modulate the sweep signal directly. Accordingly, the intermediate steps characterised in FIG. 6 with e) or c) to e) can if necessary also be skipped.

FIG. 7 illustrates an example for multiple coverage of a frequency band with F2 signals identical to configured carrier sweeps. Both thickly printed lines represent the sweeps belonging to one signal with the time slot $t_w$. The sweeps, which belong to different signals, are distinguished by preset time displacement values $t_s$ (time slot).

According to the present invention the sweeps of the F2 signals can be configured according to a specific protocol which is set down for both the sender and for the receiver. In general the protocol lays down what the sweep looks like (time function of frequency change) and how it is distributed over frequency bands, if necessary. The protocol can be different for each pair for example, where the danger of mutual influence of the signals is reduced on a common frequency band in multi-user operation in particular. If on the other hand an identical sweep configuration is used for several F2 signals in parallel operation, the transmission protocol can for example serve to bring about appropriate time staggering by installation or allocation of the time slots or time displacement values (time slots) (see example in FIG. 7).

It can be provided that the protocol can be varied during operation according to a previously set plan or corresponding to transmitted signal coding (transmission of a command "change from protocol 1 to protocol 10" or similar).

A further possibility of excluding a chance complete transmission of several F2 signals is to set up unidentical distances between the sweeps. FIG. 8 shows an example for a pseudo-random arrangement of the sweeps of an F2 signal in a frequency band (random time mix). The dotted lines indicate where the pertinent sweeps were to have been expected in the event of identical distances. The advantage of introducing pseudo-random distances also is that without allocation of special time slots (time slots), that is, with random temporal mixing of signals in multi-user operation, complete heterodyning of two or more different signals is practically excluded. Heterodyning of individual sweeps can be compensated by means of suitable correction algorithms.

FIG. 9 illustrates an example for a transmission protocol, in which the carrier sweeps of an information signal are divided into two different, preferably adjacent frequency bands $\Delta f_a$ and $\Delta f_b$. Alternating switching to 2 different channels or bands follows, without the characteristic rise in frequency changing.

Receiver-side Demodulation

Receiver-side demodulation of sweep carrier waves according to the present invention takes place according to the same principles, as described in PCT/DE99/02628 (WO 00/11817). Hereinbelow mention is made only of principles of transfer of the information signal to a constantly fixed frequency band, for example by mixing or multiplication with an artificially generated auxiliary frequency (sweep heterodyne frequency). Additional measures known per se for improving the S/N ratio and bandpass filtering can be provided.

FIG. 10 diagrammatically illustrates in the upper part the receiver result on a frequency band which is used in parallel operation by several users simultaneously. Here the F2 signal specified for the given receiver is emphasised by a thick line and the time slot, in which the sweep to be analysed immediately is located, is characterised by dashed vertical lines. The lighter lines refer to extraneous F2 signals. On the part of the receiver an artificial wave (sweep auxiliary frequency or heterodyne frequency) is generated by the system internally, which in the present example in the pertinent time slot $t_{sweep}$ has the same relative frequency change $\Delta f_{het}$, as the carrier sweep of the F2 signal to be processed, and differs from this with respect to the frequency position, lies lower for example—as illustrated in the lower section of FIG. 10.

Then comes mixing or multiplication of each received sweep with the heterodyne frequency. The result is illustrated in FIG. 11, which has in its upper part a similar starting configuration as in FIG. 10. By projecting the sweeps to be analysed on an auxiliary frequency by means of a mixer or multiplier the carrier frequencies of all sweeps lying in the pertinent time slot of this pattern are transferred to constant fixed frequencies differing in height (lower part of FIG. 11). The desired signal component, in this case the frequency-transformed sweep, is then simply filtered out of this spectrum, for example by means of a bandpass filter. At the same time also the side bands arising during transformation are filtered out, if necessary (not illustrated here). The thus transformed and "cleansed" sweep can then be further processed like a "normal" signal by means of methods used in signal processing with constant carrier frequency, and with respect to the information-bearing parameters for instance the phase angle, the amplitude or, in the case of a frequency modulation also with respect to the frequency cycle still remaining after transformation or the dynamic of the phase change are analysed. This constitutes a substantial advantage of F2 technology to the extent that it requires only the intermediate step of frequency transformation to be fully compatible with all known and proven methods of signal processing.

In addition, the F2 method further comprises the possibility, for example by deviation of the transformed carrier frequency from the expected nominal value, of recognising and analysing a Doppler shift, for example to determine the speed of the distance change between sender and receiver, or to consider the Doppler shift determined to such an extent or in some other way during generation of the sweep auxiliary frequency and to thus improve the quality or stability of data transmission. This configuration is particularly beneficial to communication between or with fast-moving objects. The possibility is again pointed out here that additional environmental data can be derived from the received signals.

A further essential advantage of the invention is that it is possible, as a result of the described frequency transformation with the auxiliary frequency in the event of multipath propagation, for example using correspondingly sharp filters or suitable FFT analysis, to separate and analyse an individual channel response or the best suited, for example the strongest channel response from the different channel responses. In FIGS. 12 and 13 (similar to FIGS. 10 and 11) a detailed picture is given, by means of which this capability, which establishes a completely new quality of information transmission especially in inhomogeneous media and structured spaces, is further explained hereinbelow.

In general the best suited, for example the strongest received component, is isolated and evaluated preferably by means of filter mechanisms or on the basis of simple or complex FFT analysis from the spectrum of the single frequencies (channel responses) contained in the transformed signal—for example as a result of multipath spreads (multipath propagation).

The effect of continuous frequency shift in the event of multipath propagation is that the individual channel responses arrive at the receiver as parallel sweeps due to their time displacement. Apart form the feed forward differences the strength of the parallel shift is determined also by the steepness of the sweeps. The effect of the frequency gradients is that the time displacement, that is, the run time differences between the channel responses, no longer interfere, rather due to their different frequencies they can be separated from one another in signal technology terms, or the influences of the side frequencies can be weakened. The steeper the sweeps are, that is, the greater the extent of frequency in the given signal section, the broader the spectral breakdown of the channel responses.

This context allows the method to be adapted optimally to different transmission conditions, in that if necessary different frequency gradients dependent on situation, that is, carrier sweeps of varying steepness are used with radio transmission in the interior of buildings, in urban areas or in the country, for instance.

FIG. 12 shows a series of channel responses (symbolised by R1 to R5), which arrive at the receiver as parallel sweeps with different time displacement (generally designated by $t_{crd}$ for channel response delay). Accordingly, the time slot widens to receive the various images of one and the same sweep by a total of $t_{sd}$ (time spread delay). FIG. 13a diagrammatically illustrates that the respective feed forward differences are depicted as different frequency positions as a result of frequency transformation. This is where the effect already explained via FIG. 4 comes in, that the energy originally distributed over the frequency range $\Delta F$ swept by the sweeps is reduced via transformation onto each frequency cell (FIG. 13b), effectively resulting in considerable improvement of the S/N (signal-to-noise ratio) and at the same time also the random influence of individual frequency portions of the noise is lessened.

But despite this overall effective improvement, as illustrated by way of example in FIG. 13b, the transformed channel responses can be designed with varying strength according to their previous history in the transmission process. As a selection criterion easy to realise in processing technology terms a solution is to determine the frequency with the respectively biggest amplitude and to filter out the corresponding component, for example by means of a controllable, correspondingly sharp filter. The filter can be correspondingly adjusted for example similarly to the method designated in PCT/DE99/02628 (WO0011817) as channel tuning. It is equally feasible to place the desired component in a preset filter window by altering the frequency position (starting frequency) of the auxiliary frequency. Using one of these measures it can be guaranteed that the best-possible S/N is used. On the other hand it can prove helpful, for example with the use of phase coding also, to extract a preferred, preferably individual component from the spectrum of the fixed intermediate frequencies, as its phase position can be influenced still less by adjacent components.

In this connection it should be emphasised especially that by means of correspondingly steep sweeps in particular also those channel responses can be separated from one another, whose feed forward difference leads to a phase delay by $\pi$, effectively excluding deletion as a result of interference with high security.

Detecting a spectrum of the transformed single frequencies contained in the signal according to FIG. 13b enables further improvement S/N ratio. All single frequencies carry the same user information with different noise influences corresponding to the various geometric transmission channels. This gives rise to evaluatable redundancy. Every two or more components (channel responses) are isolated and analysed separately from one another. Then the evaluation results are compared or balanced, for example by forming the average values out of the respective signal parameters if necessary with weighting corresponding to the strength of the pertinent components. This means that with natural redundancy caused by multipath propagation, that is, the appearance of several images (channel responses) of one and the same information signal (one of the previous major problems of data transfer) now for the first time the evaluation quality can be improved. Despite the abovedescribed improvement of the S/N ratio and partial evening out of the noise influences over a certain frequency range random phase scattering can still be caused by noise, in particular with very short pulse times. In signal technology the attempt is usually made to combat these influences by prolonged pulse times, effecting a temporal approximation of the mean. In F2 technology however the parallel offer already set by nature can also be used in the form of diverse multipath components (echoes), in that the information-bearing signal parameters are evaluated simultaneously for example in a parallel evaluation process for several multipath components and then balanced with one another in an appropriate manner.

Various possibilities for moving the multipath components synchronously by means of special processing techniques and then combining the signal energy of these portions into one frequency in order to obtain and evaluate a correspondingly stronger total signal have already been described at the outset.

FIGS. 23 to 28 illustrate the method for blind signal processing. An example of one of the processing methods according to the present invention is shown, wherein the receiving signal (depicted in the form of two multipath components with the time displacement $\tau$) on the one hand is multiplied in two parallel processing steps with an artificially generated heterodyne frequency, which is in a higher frequency band, and on the other hand is multiplied with a second heterodyne frequency, which has the same frequency characteristic compared to the first heterodyne frequency, but lies in a deeper frequency band. FIG. 23 shows that both auxiliary frequencies are generated synchronously to one another, but this generation does not need to be synchronised with the receiving signal. The length of the sweeps $T_{sw}$ however in all case is the same. The arrows designated by $\Delta\omega$ and corresponding indices illustrate the momentary imminent ratios which result due to the random time displacement between the multipath portions of the receiving signal and the auxiliary sweeps.

FIGS. 24 and 25 illustrate the pertinent sections again in detail. FIG. 24 gives a detailed illustration for projection on the upper auxiliary frequency and FIG. 25 gives a detailed illustration for projection on the lower auxiliary frequency. In this context phase transformation of one or both spectra can also be carried out, if required. FIGS. 26a and 26b diagrammatically illustrate both spectra resulting from multiplication with the pertinent auxiliary frequencies. Mirrored in these spectra are the individual spectral portions with respect to the central frequency of each spectrum (designated here in both cases by $\Delta\omega$). In case the middle frequencies of the auxiliary sweeps (heterodyne frequencies) are not arranged symmetrically to the receiving signal, the central frequencies of both spectra may also differ. Only the symmetrical ratios inside these spectra are important. In the right part of the images each of the filter functions is diagrammatically illustrated, by means of which the time displacement of the spectral components is corrected. This processing step can also be designed for equalisation of individual frequency or phase distortions, for fine synchronisation of the elements in both spectra, if necessary. FIGS. 27a and 27b show similarly to FIGS. 26a and 26b the position of the frequency portions after shift along the time axis. When the spectra illustrated in FIGS. 27a and 27b are now multiplied with one another the previously synchronised elements are gathered in the form of an appropriate wave with the frequency 2 Δω, whereby the signal energy is also concentrated in the corresponding frequency window. FIG. 28 shows the result of such an operation. The new central frequency (illustrated as a thick line) can be filtered out from here on and evaluated.

Sending and Receiving Devices

FIG. 14a shows a sending device 10 according to the present invention which has a sender-side generator 11 for generating gradient carrier waves (GCW), a modulator 12 for its modulation and a mixer 13. The generator 11 is configured to generate gradient carrier waves, or carrier sweeps along the aforementioned principles and is structured using controllable signal forms known per se. The modulator 12 aids in coding the information which is to be transmitted. This happens in accordance with coding methods selected depending on application and known in and of themselves. The mixer 13 is a module for combining carrier and information components (mixer, multiplier or the like). It has an output 14 which is connected if necessary to a filter unit 15 or via a sender directly to the physical transmission channel. The filter unit 15 is preferably formed by a bandpass filter unit (BPF) which can be interposed between the output 14 and the send antenna or a send transformer (not illustrated here). The filter unit 15 aids in removing any secondary frequencies. Insofar as these do not interfere the module can also be connected directly to the output.

In this sender system the input information (symbol) is converted by the modulator 12 in signal technology terms and then impressed in the module 13 for combining the gradient carrier wave generated by the GTW generator 11 likewise connected to this module. Both switches 16 and the bandpass filter (BPF) depicted by a dashed line illustrate that the filter unit 15 can be switched in series facultatively preferably with the module.

FIG. 14b illustrates an embodiment of a receiving device 20 according to the present invention which has a receiver-side generator 21 for generating an artificial auxiliary frequency, preferably a gradient wave or sweep, a projection device 22 for heterodyning with the receiving signal received by a receiving antenna or a receiver transformer (not illustrated), a separating device 23 for separating signal components and a demodulator 24. The circuits 21–24 form a setup for detecting signals with variable carrier frequencies.

The generator 21 is likewise set up with controllable signal forms known per se. The projection unit 22 comprises a mixer, multiplier or similar. The separator 23 contains at least one module for separating signal components, for example a bandpass filter unit (BPF), a controllable filter unit or an FFT unit. The demodulator 24 aids in signal analysis/demodulation and outputs the transmitted information as a symbol. With using a complex FFT analysis unit the module can be realised for separating and the demodulation device can also be realised in the form of a common switch unit.

FIG. 15 is a sectional view of a variation of a receiving device which enables targeted processing of a multipath component.

The following variations on the sending and/or receiving devices have advantages in particular also in multi-user mode. FIGS. 16 and 17 illustrate examples in which several parallel generation or processing channels are provided, whereby each modulator or generator is connected preferably parallel and interconnected via central control module (not illustrated) which controls the form, height and temporal sequence of sweeps and/or their modulation (preferably corresponding to the send or transmission protocol). Accordingly the receiving devices can likewise have a control module which correspondingly controls signal processing. If necessary several circuits are switched in parallel as in FIGS. 14a, 14b or FIG. 15, which are interconnected via a common control module and can be complemented by other switching elements.

Applications

Figure 1A:
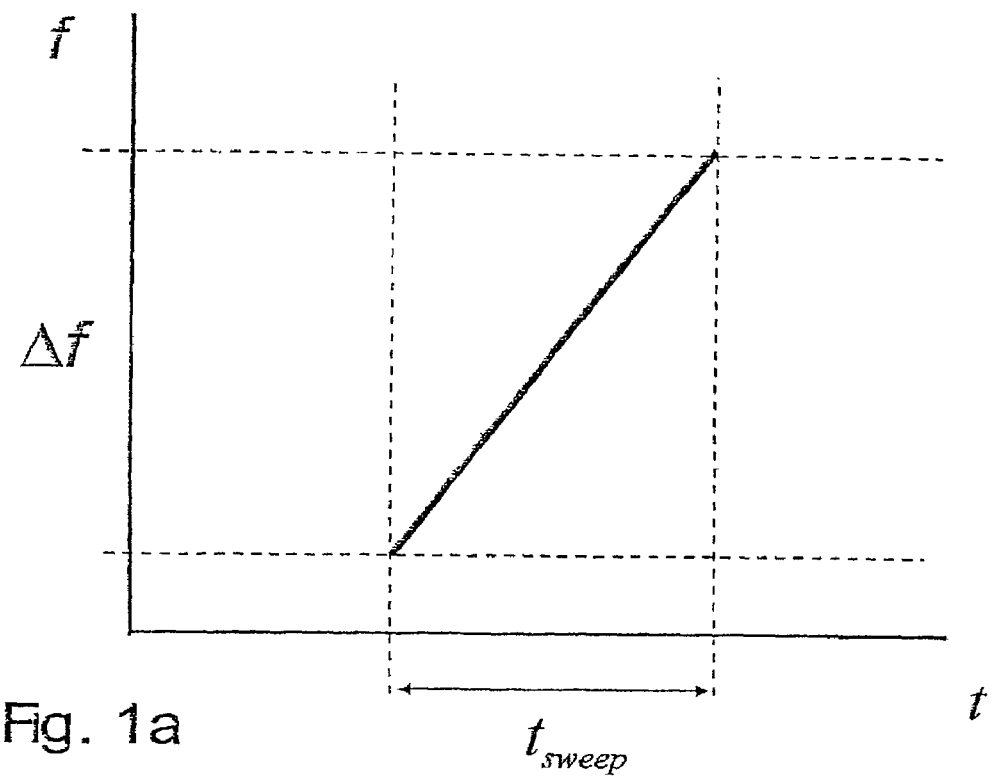
Figure 1B:
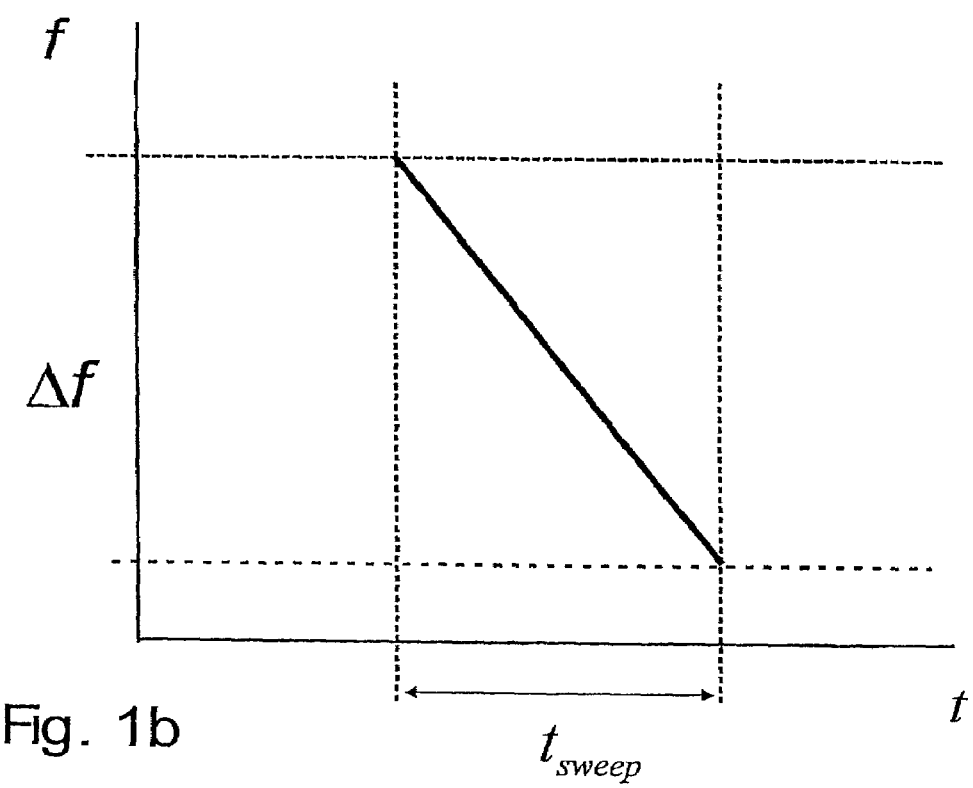
Figure 2A:
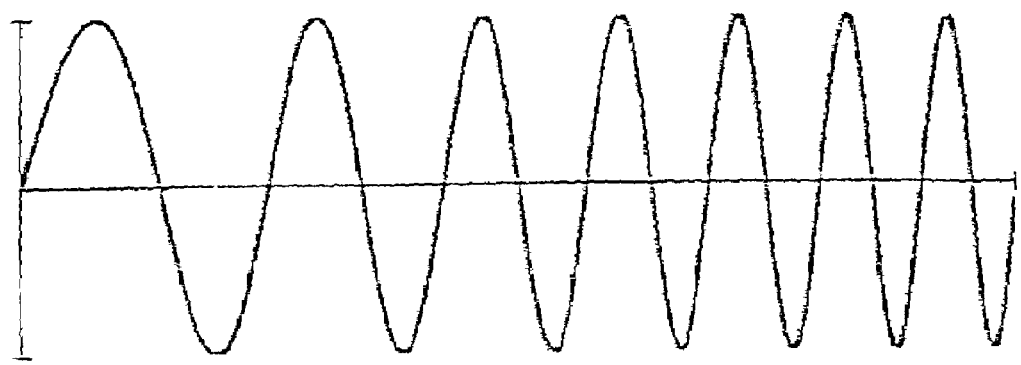
Figure 2B:
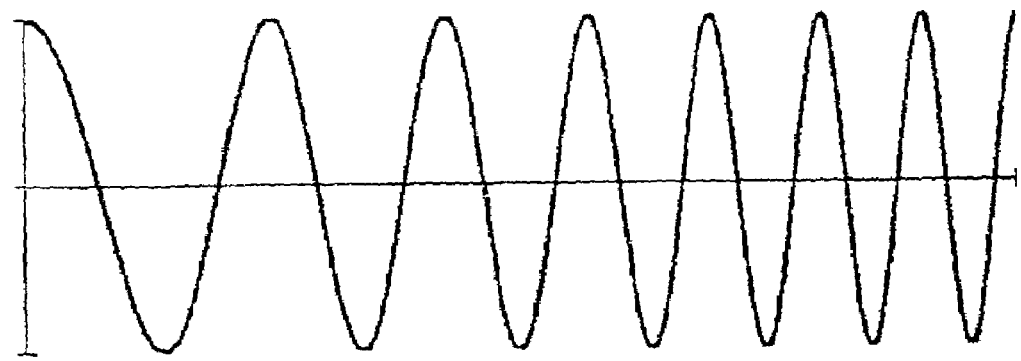
Figure 3A:
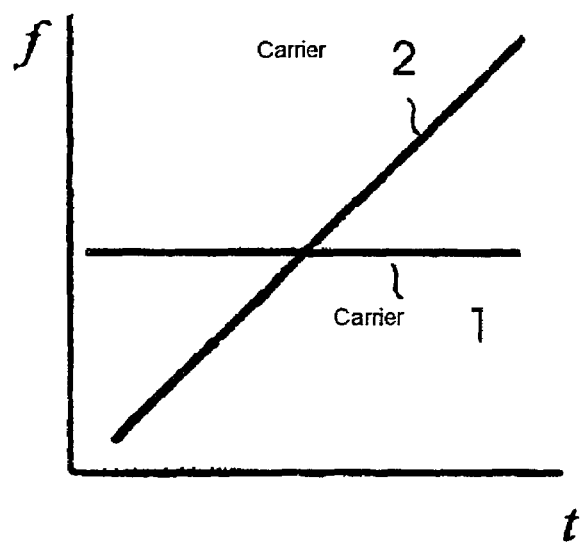
Figure 3B:
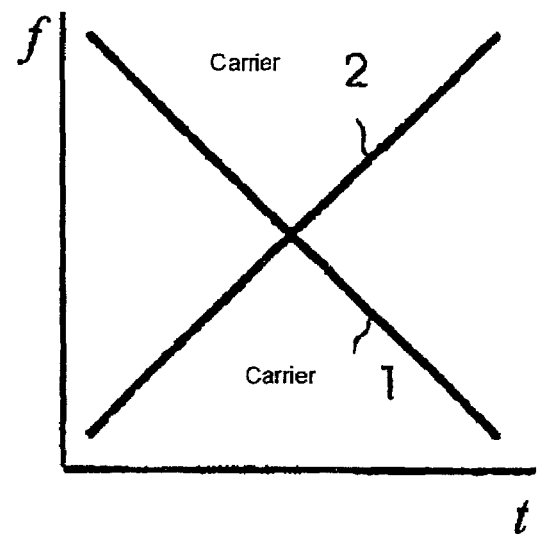
Figure 5:
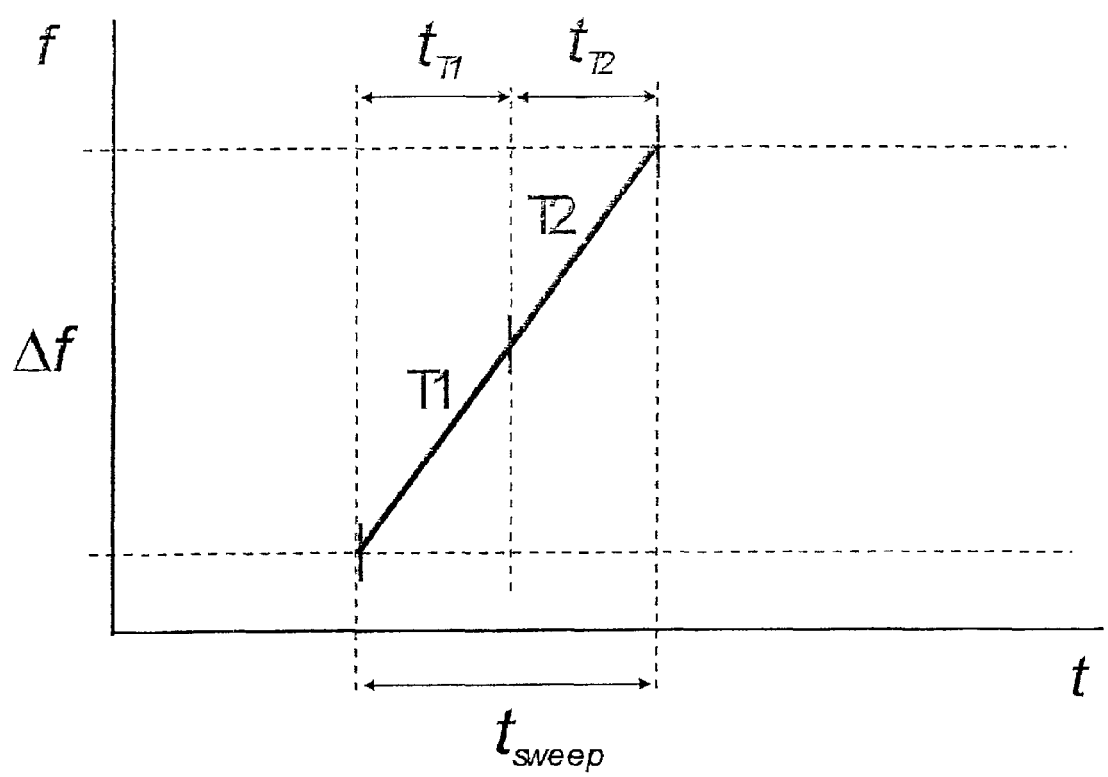
Figure 6:
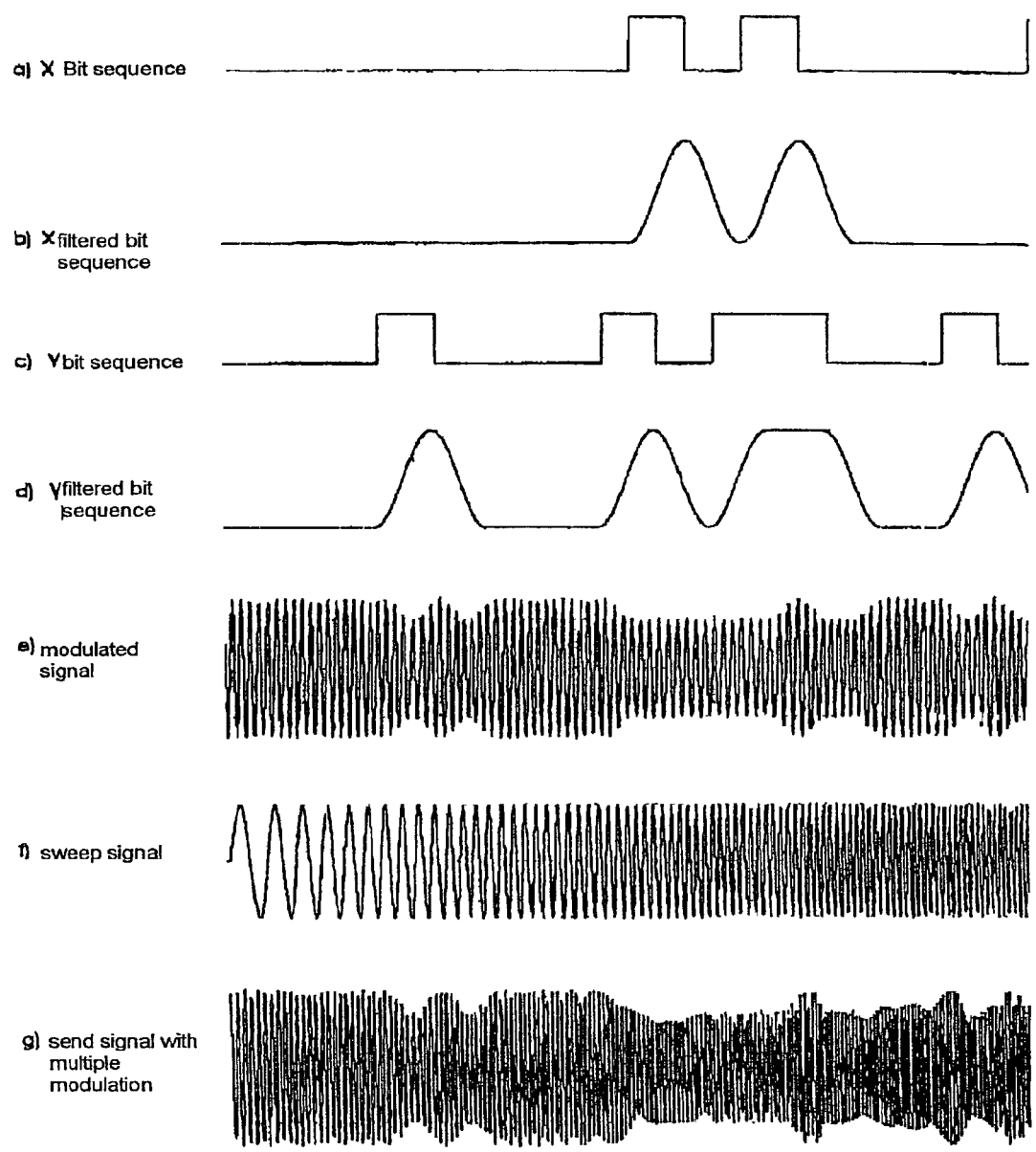
Figure 7:
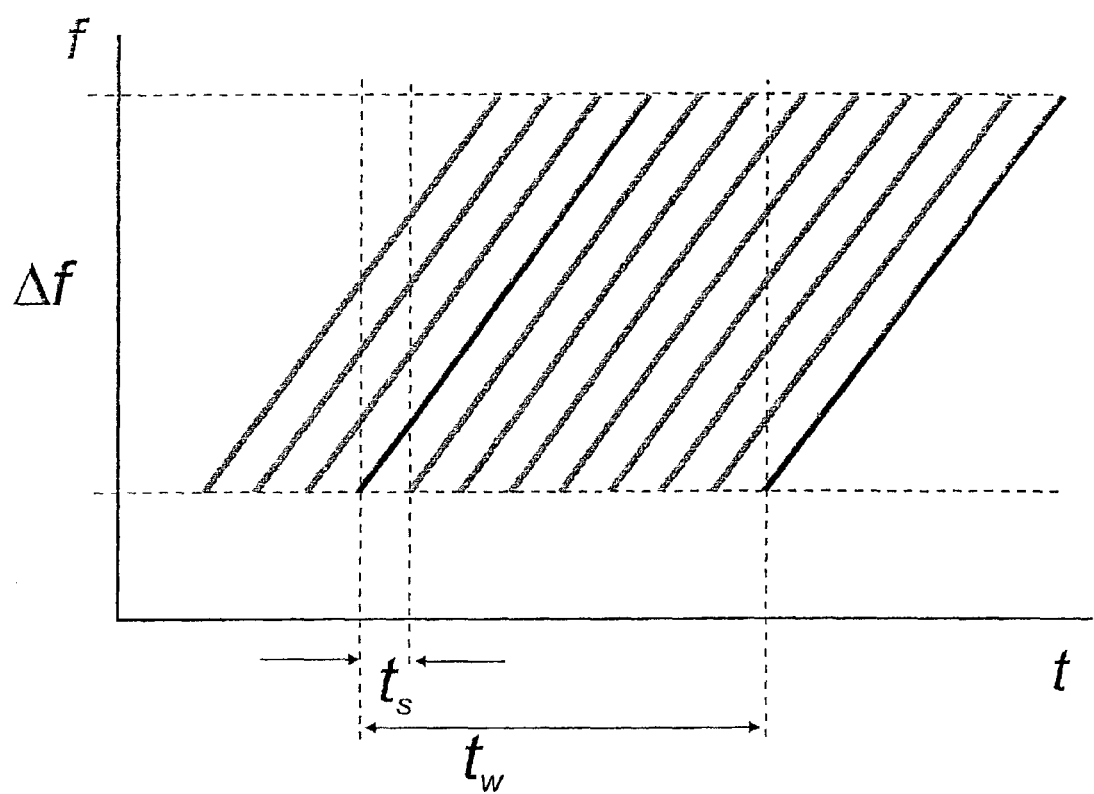
Figure 8:
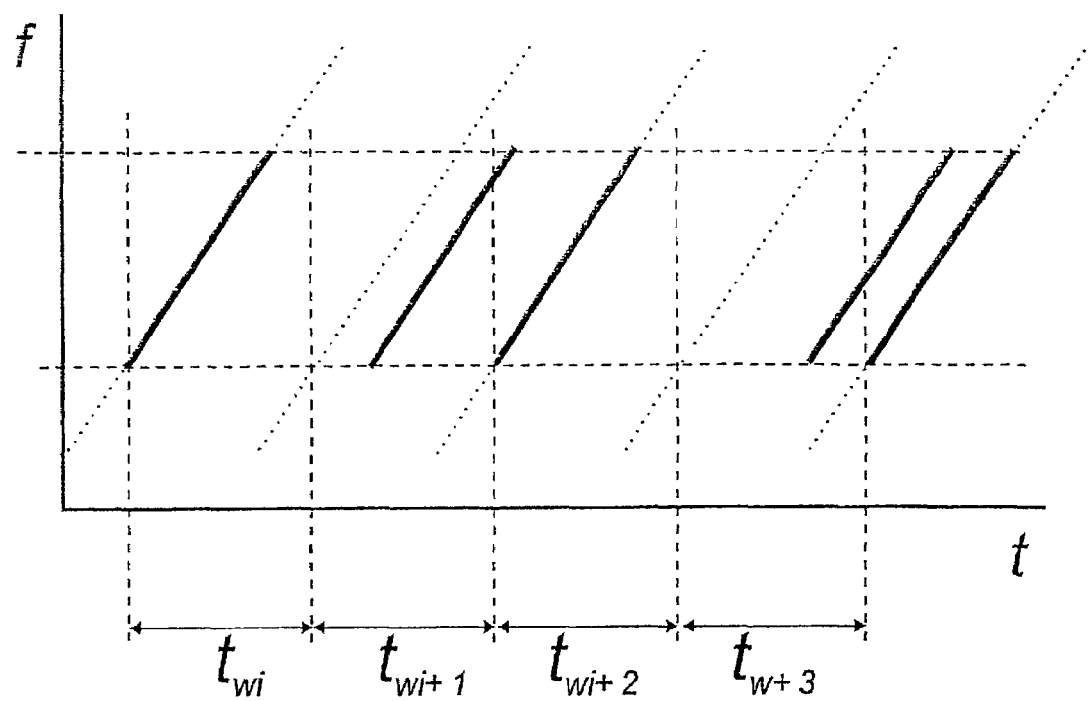
Figure 9:
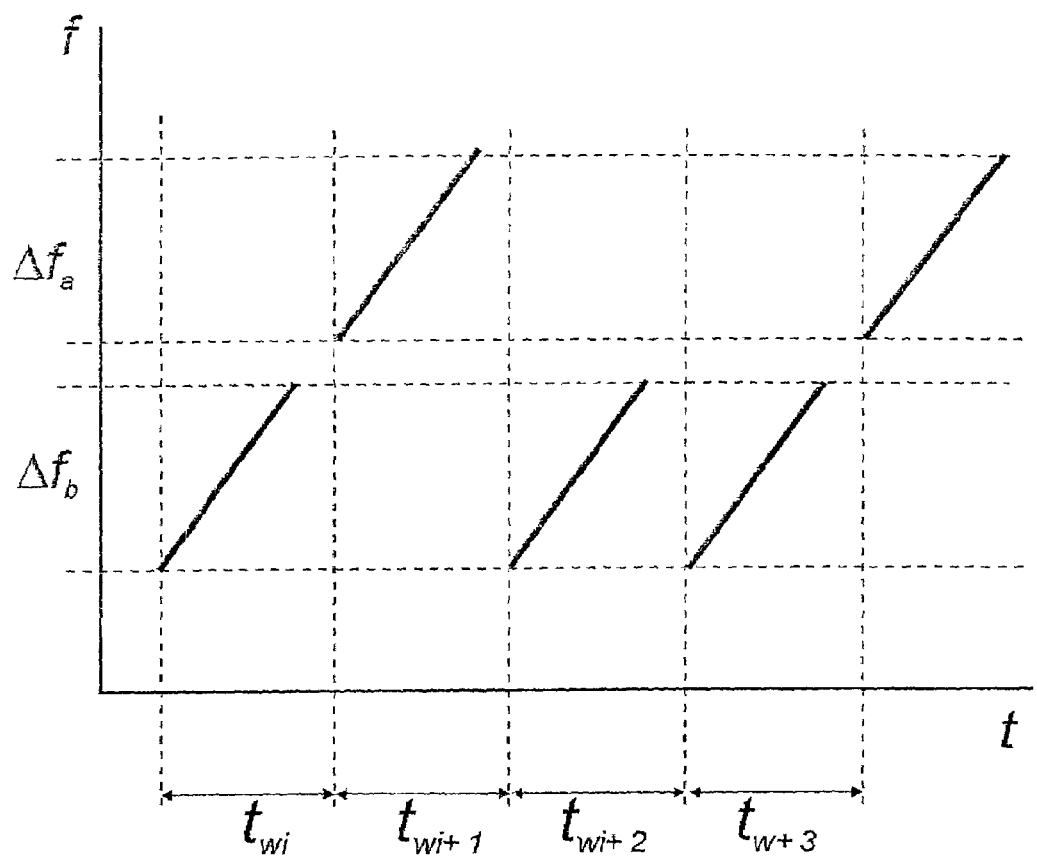
Figure 10:
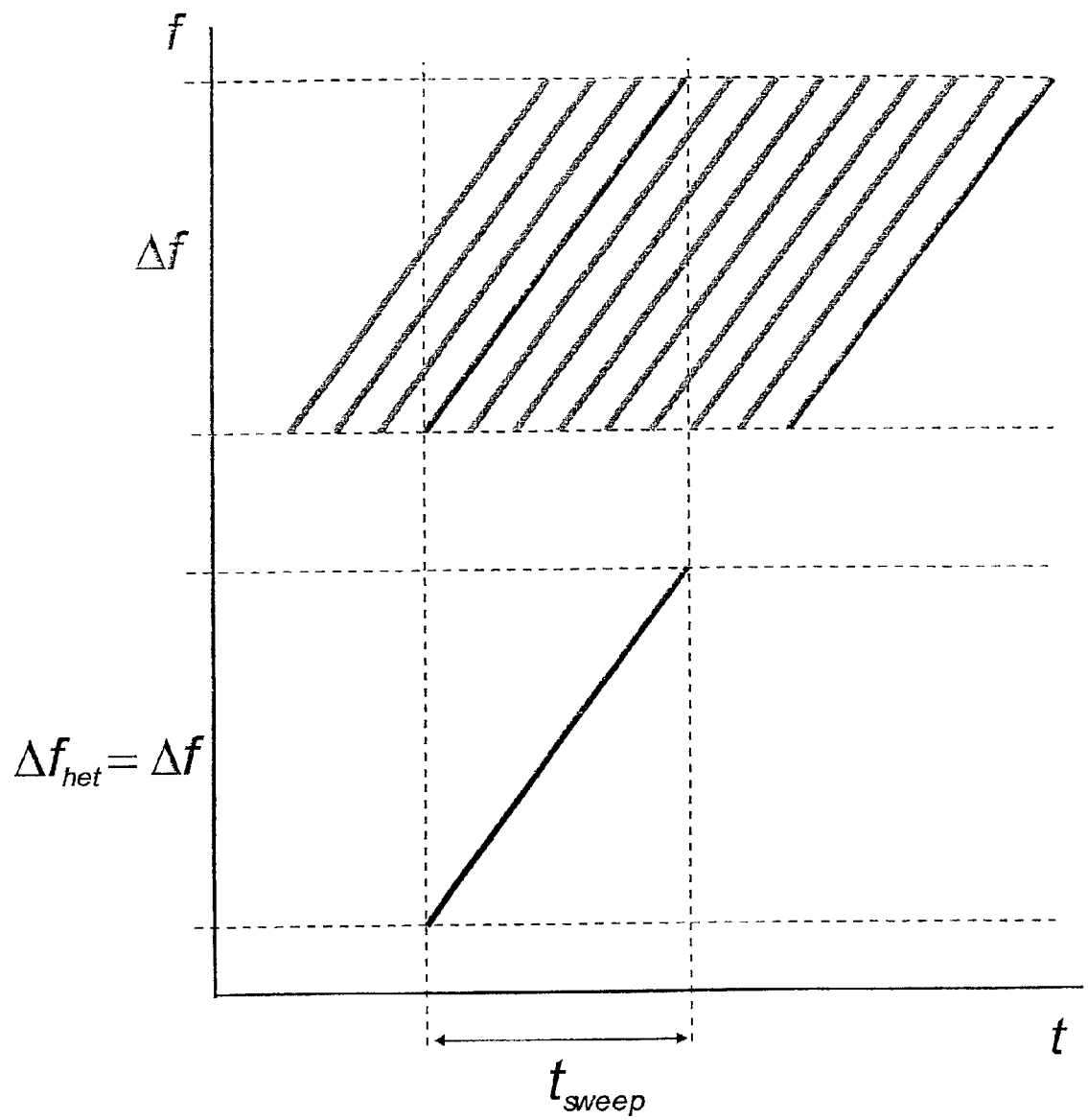
Figure 11:
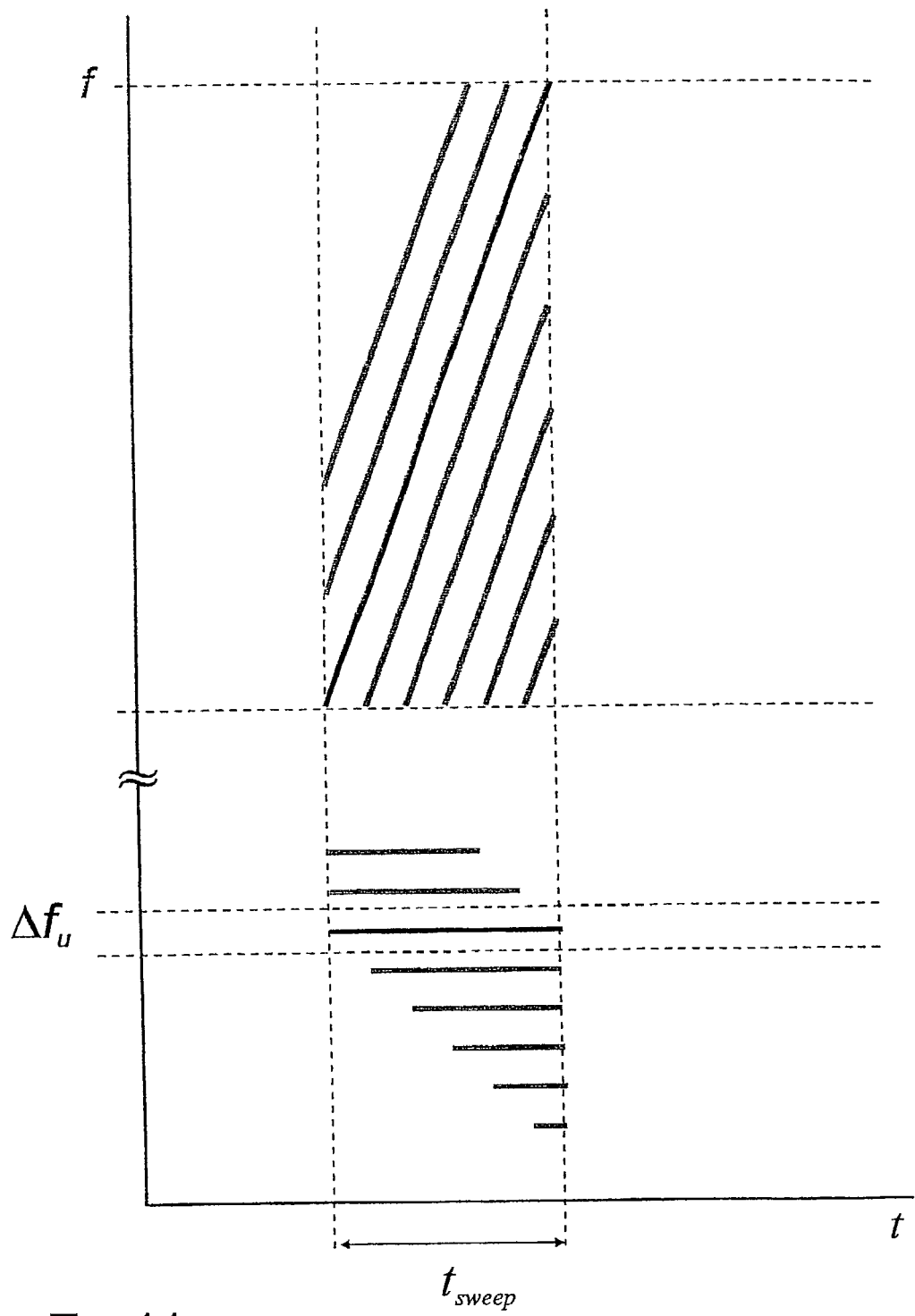
Figure 12:
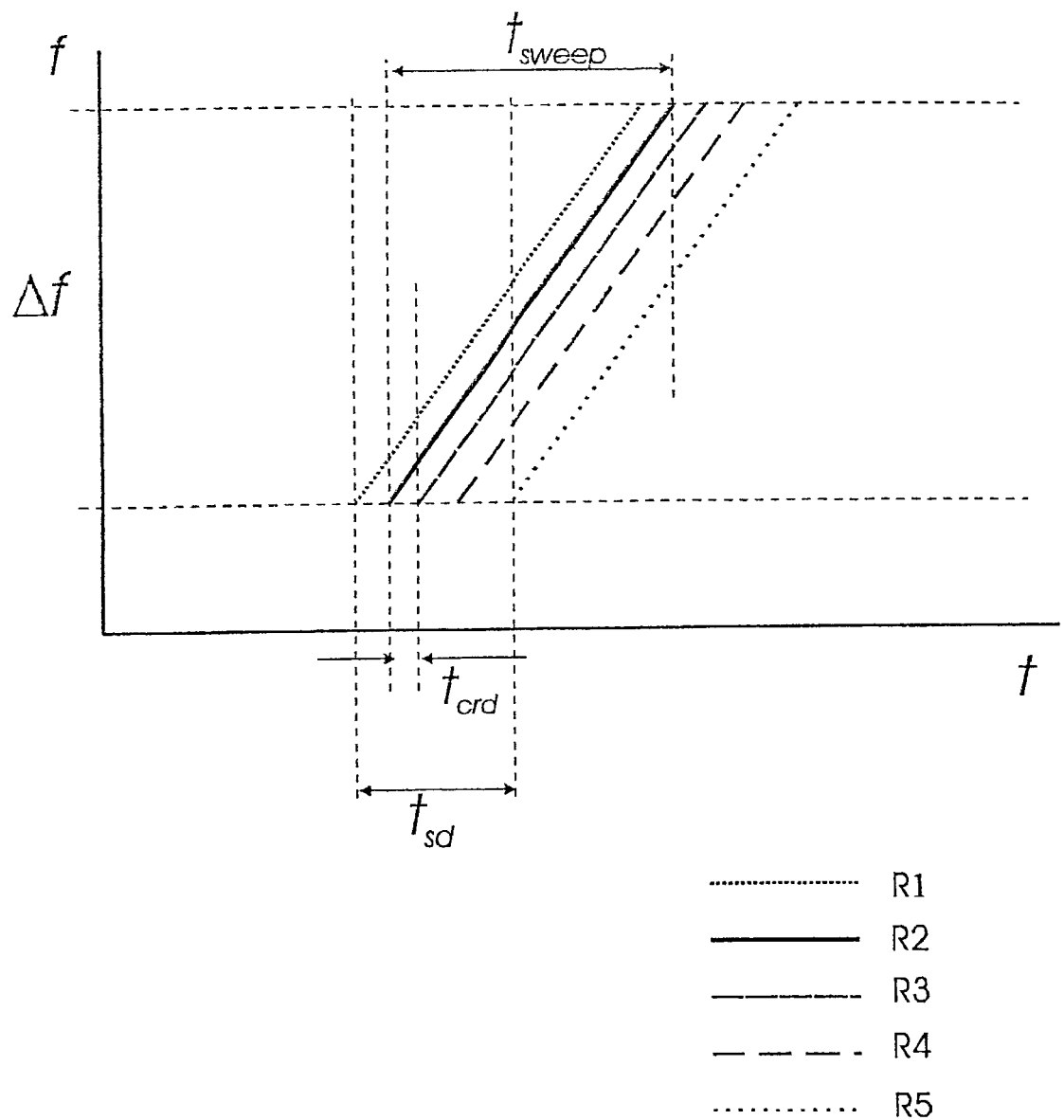
Figure 13A:
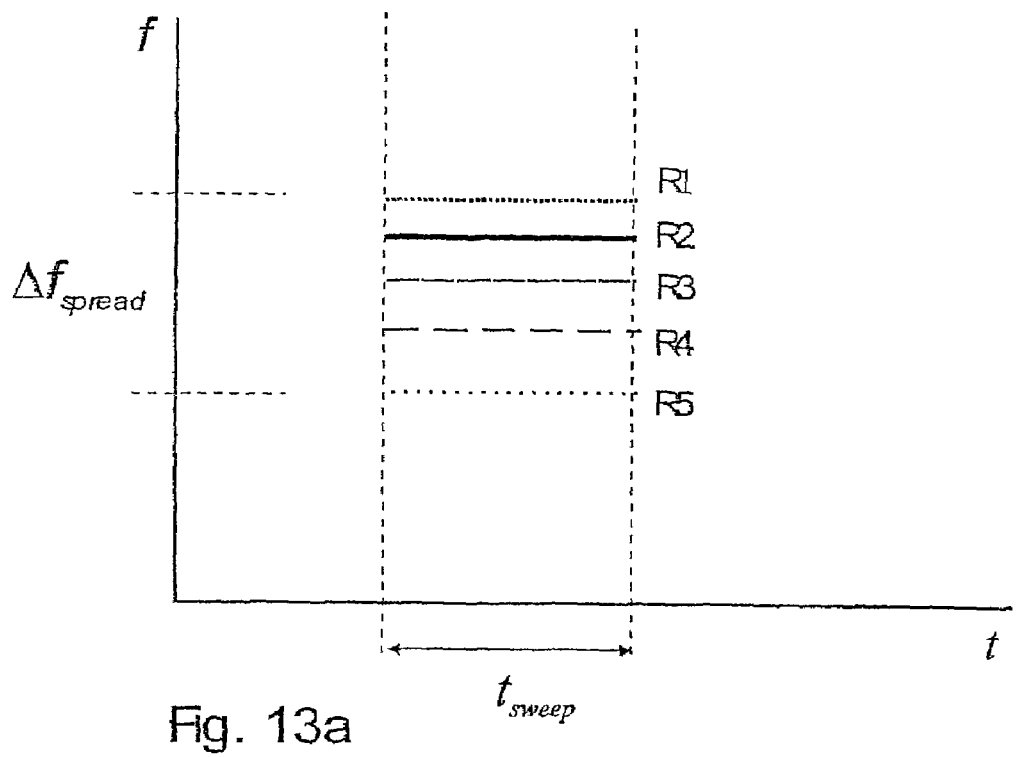
Figure 13B:
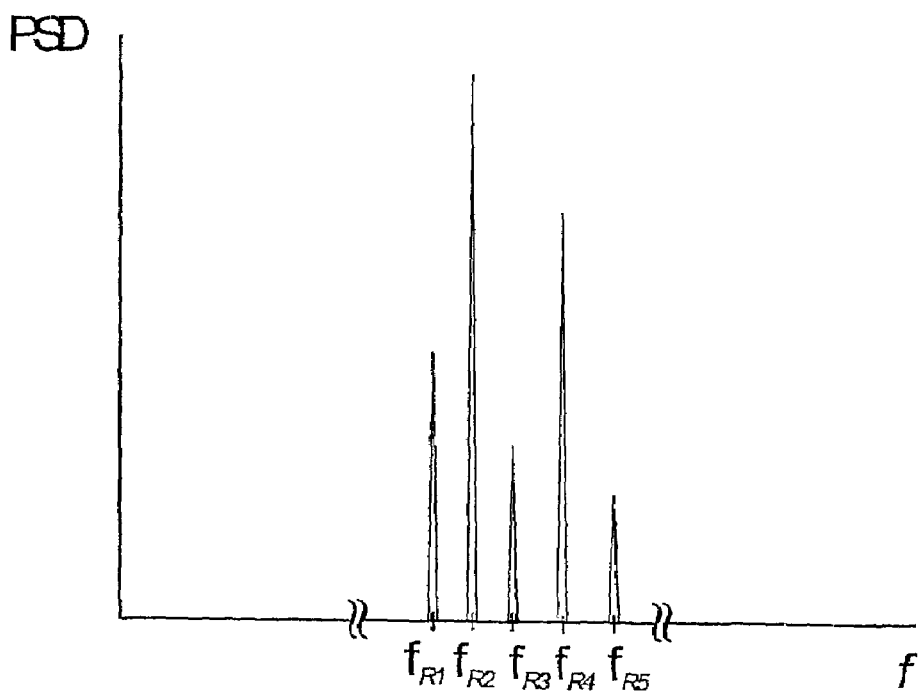
Figure 14A:
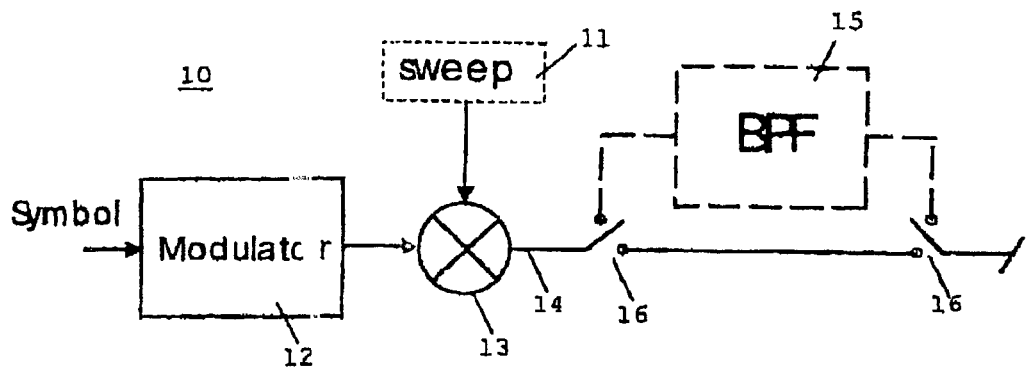
Figure 14B:
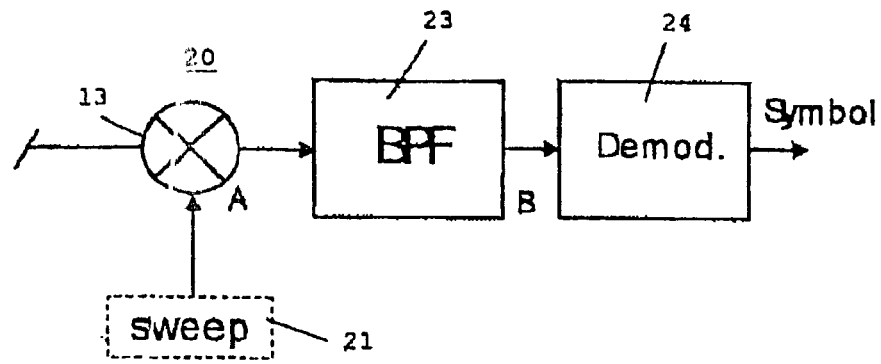
Figure 15:
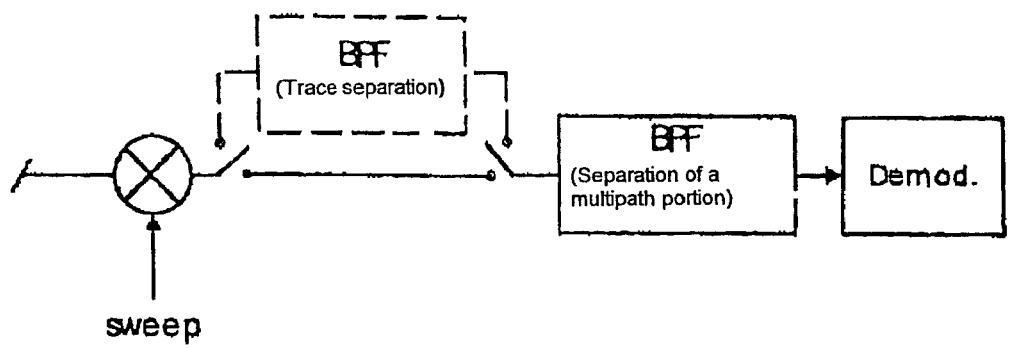
Figure 16:
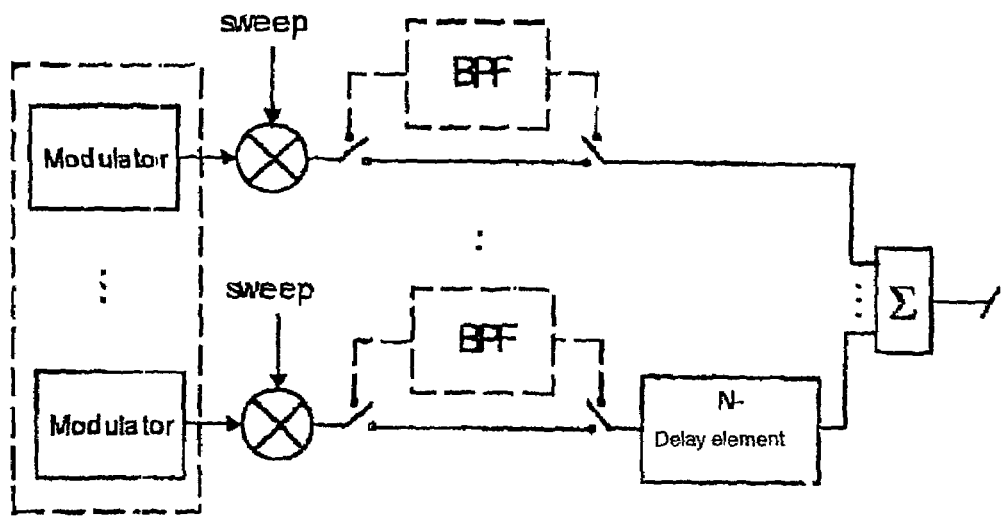
Figure 17:
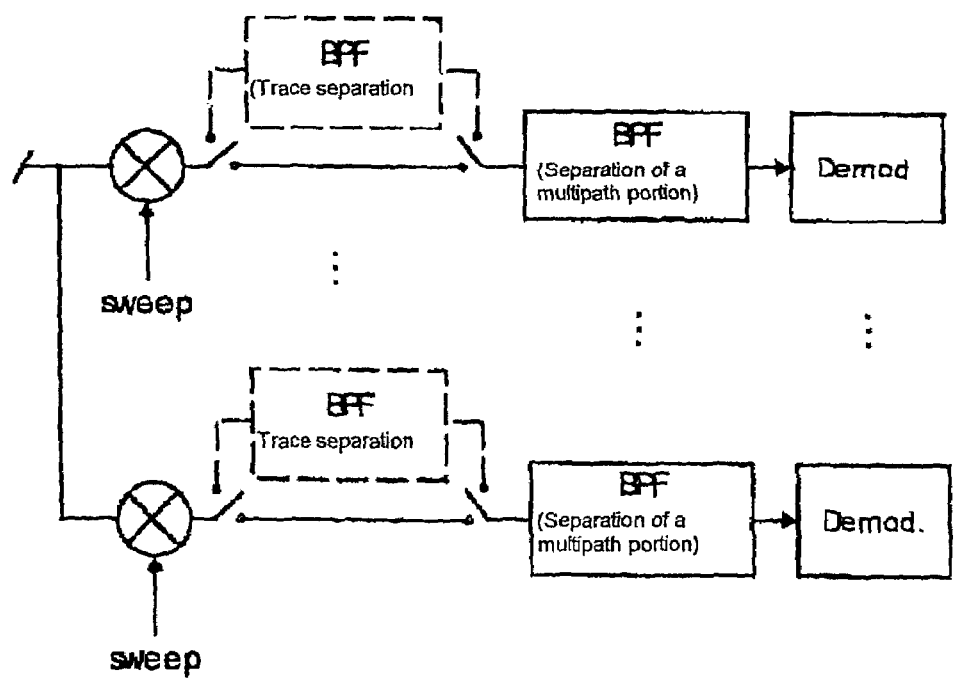
Figure 18:
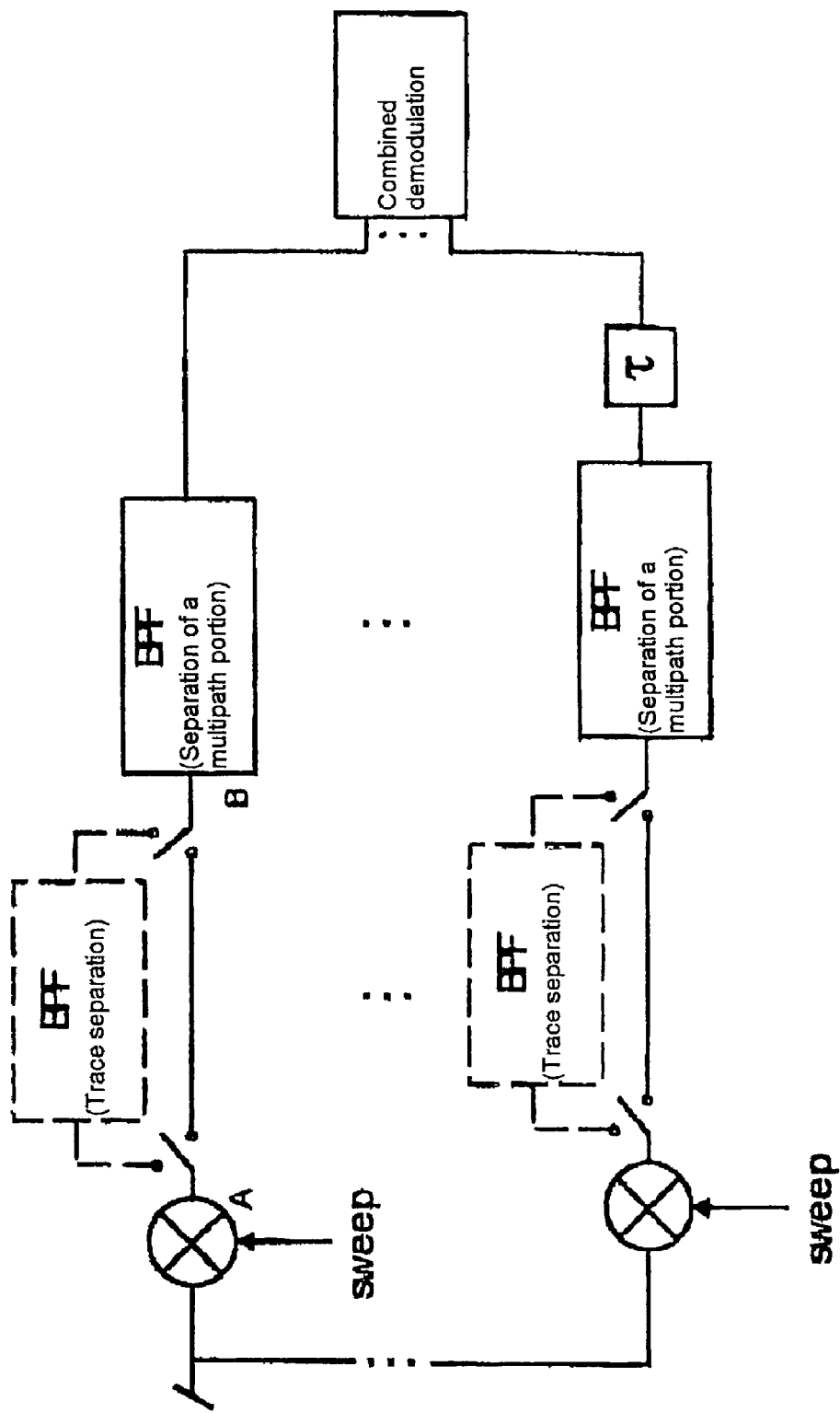
FIG. 18 is a block diagram of a receiving device for combined evaluation of multipath components, whereby an assembly for correcting distortions or shifts, for example temporal shifts, is designated by τ.
Figure 19:
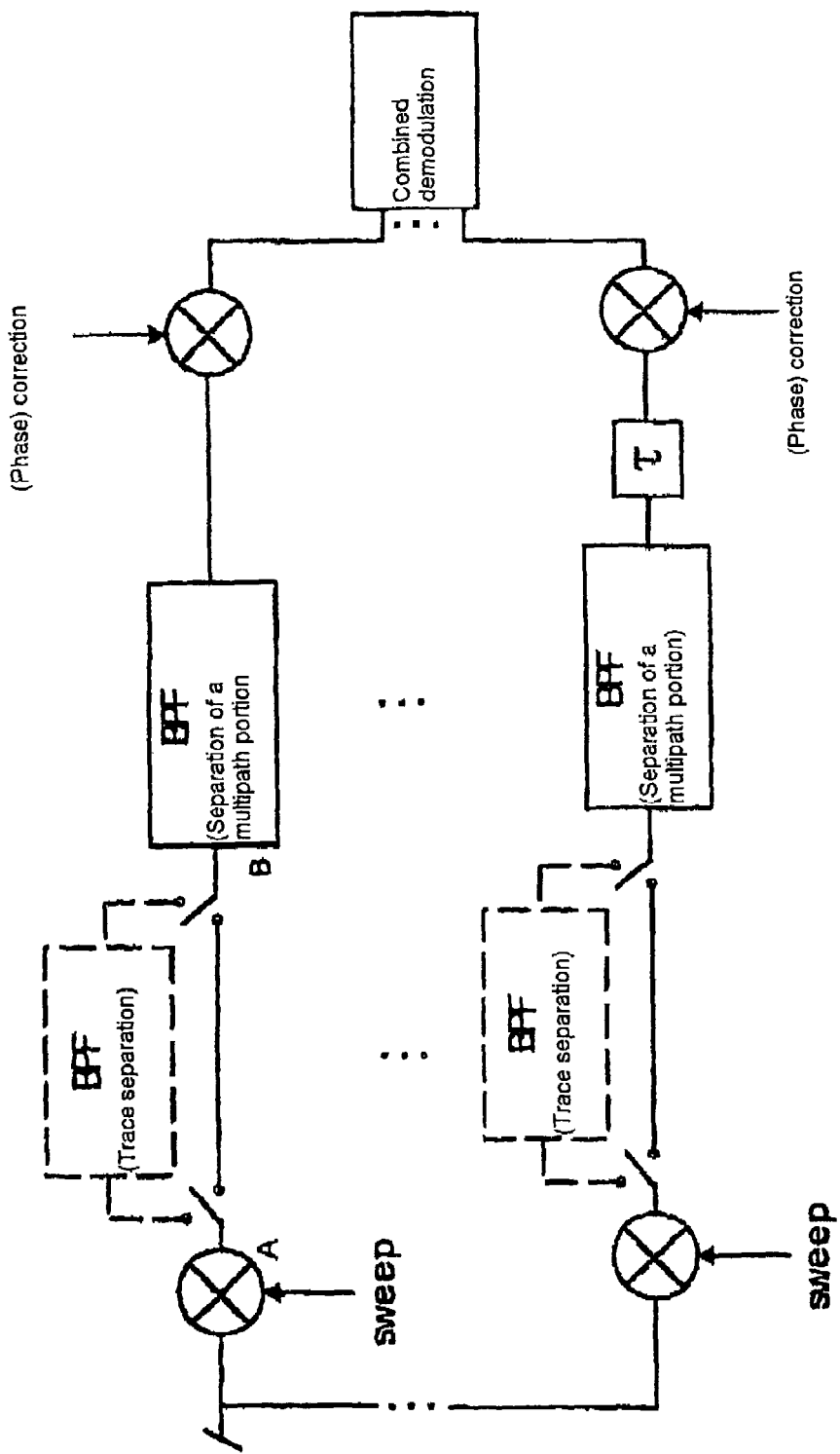
FIG. 19 shows a block diagram of a section of a receiving device for combined evaluation of multipath components with individual phase correction as a further development of FIG. 18.
Figure 20:
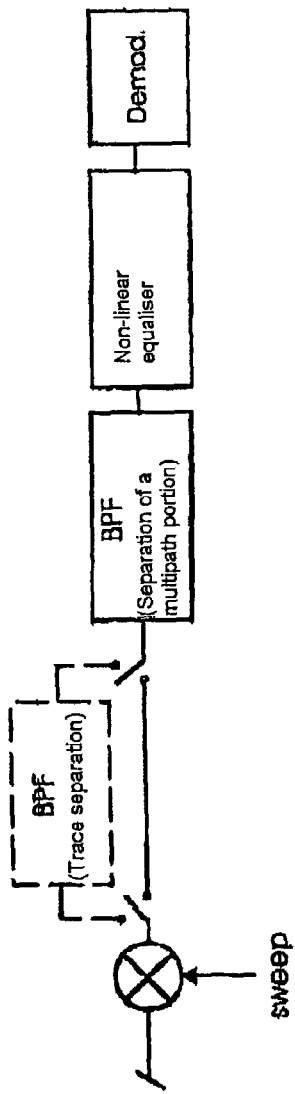
FIG. 20 shows in detail in a block diagram a processing channel of a receiving device with an additional, non-linear filter unit for equalising a multipath component.
Figure 21:
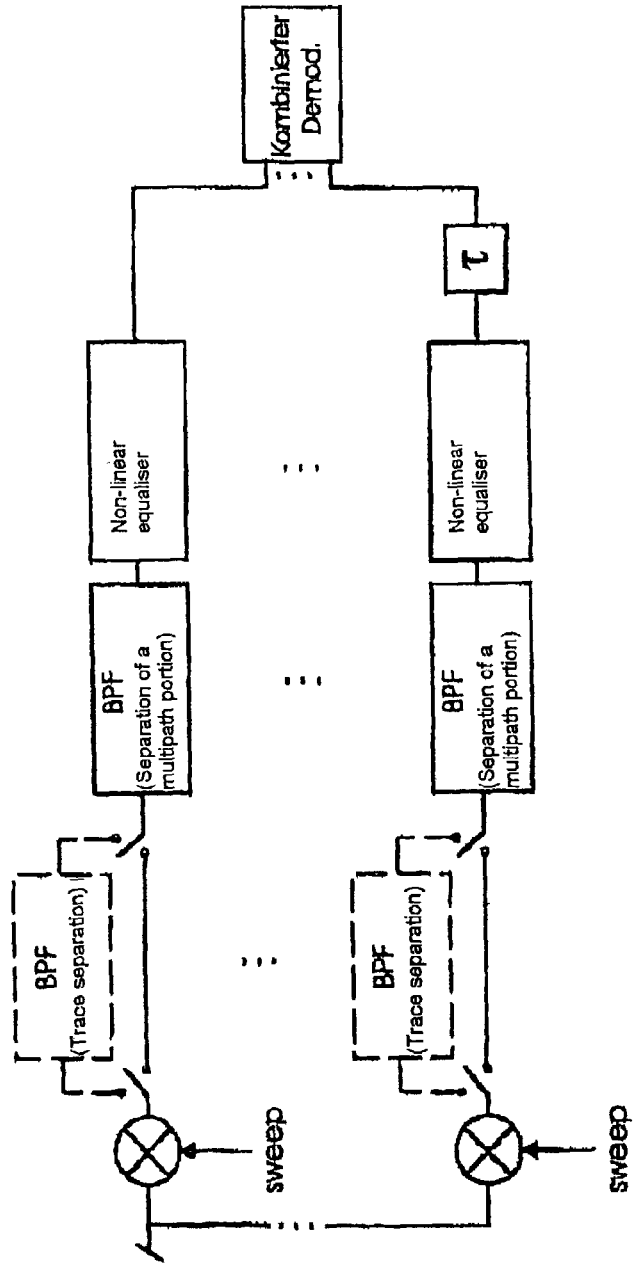
FIG. 21 shows following FIG. 20 a design for combined evaluation of multipath components with circuit elements for individual fine correction.
Figure 22:
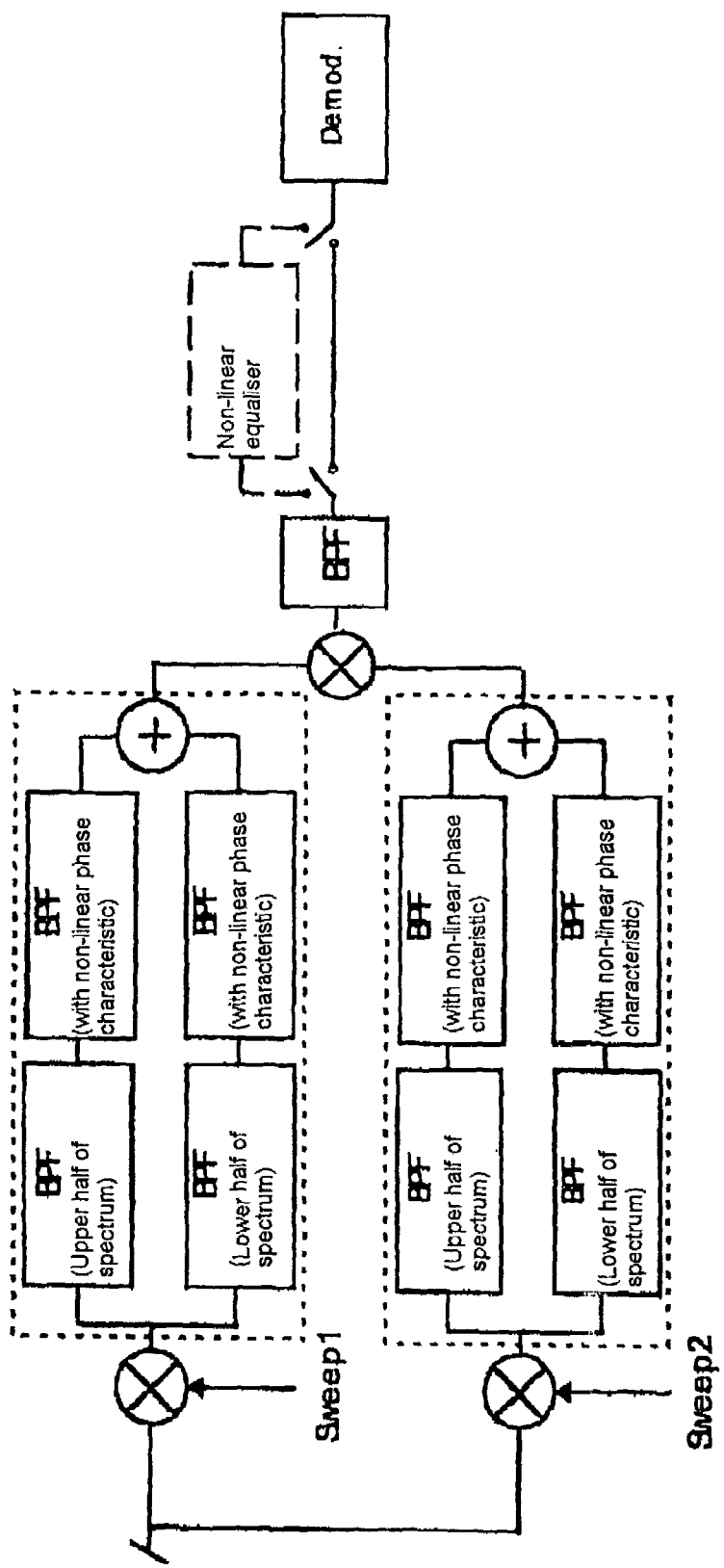
FIG. 22 shows an example of the central section of a receiving unit for the abovementioned "blind" signal generation.
Figure 23:
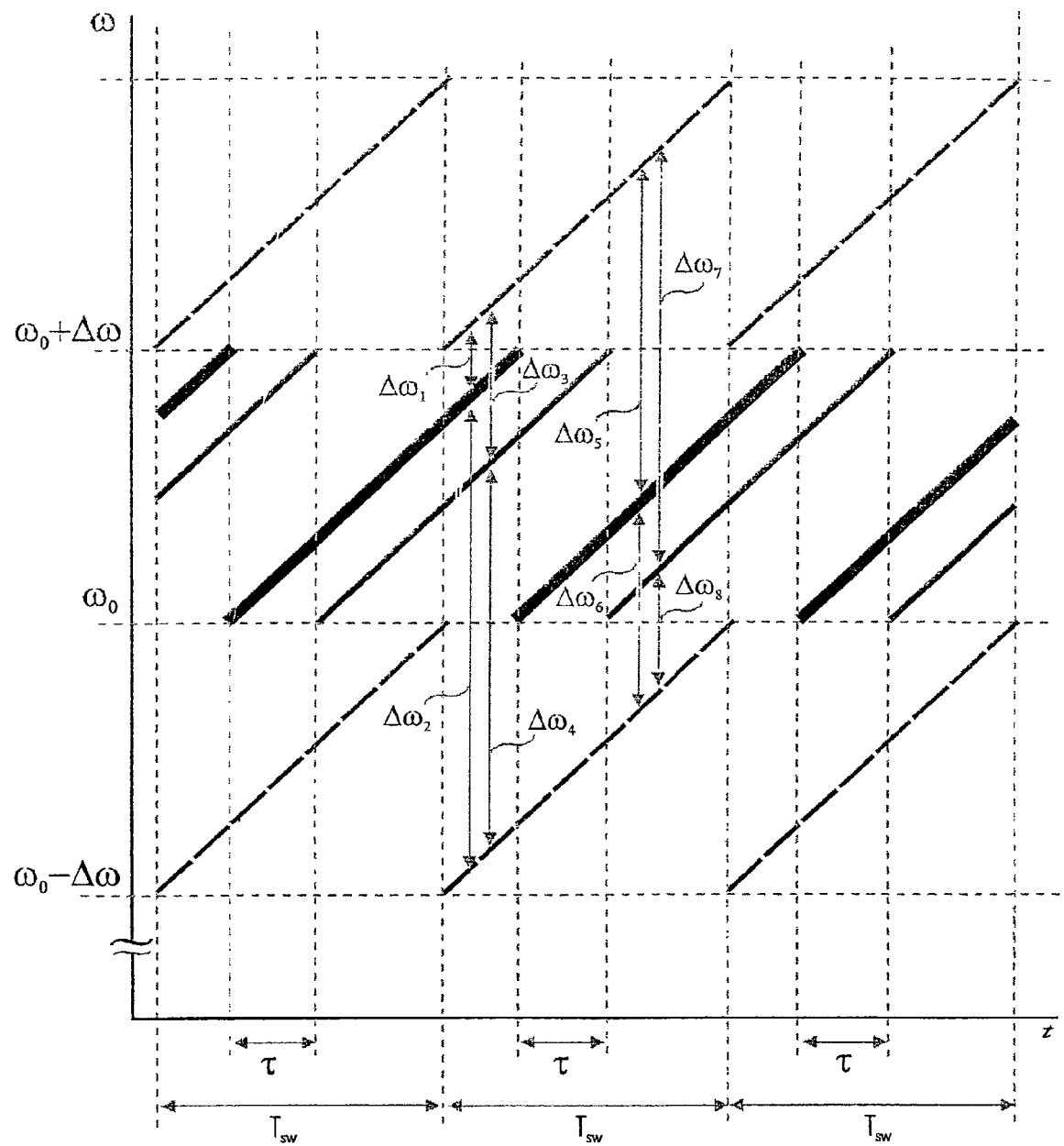
Figure 24:
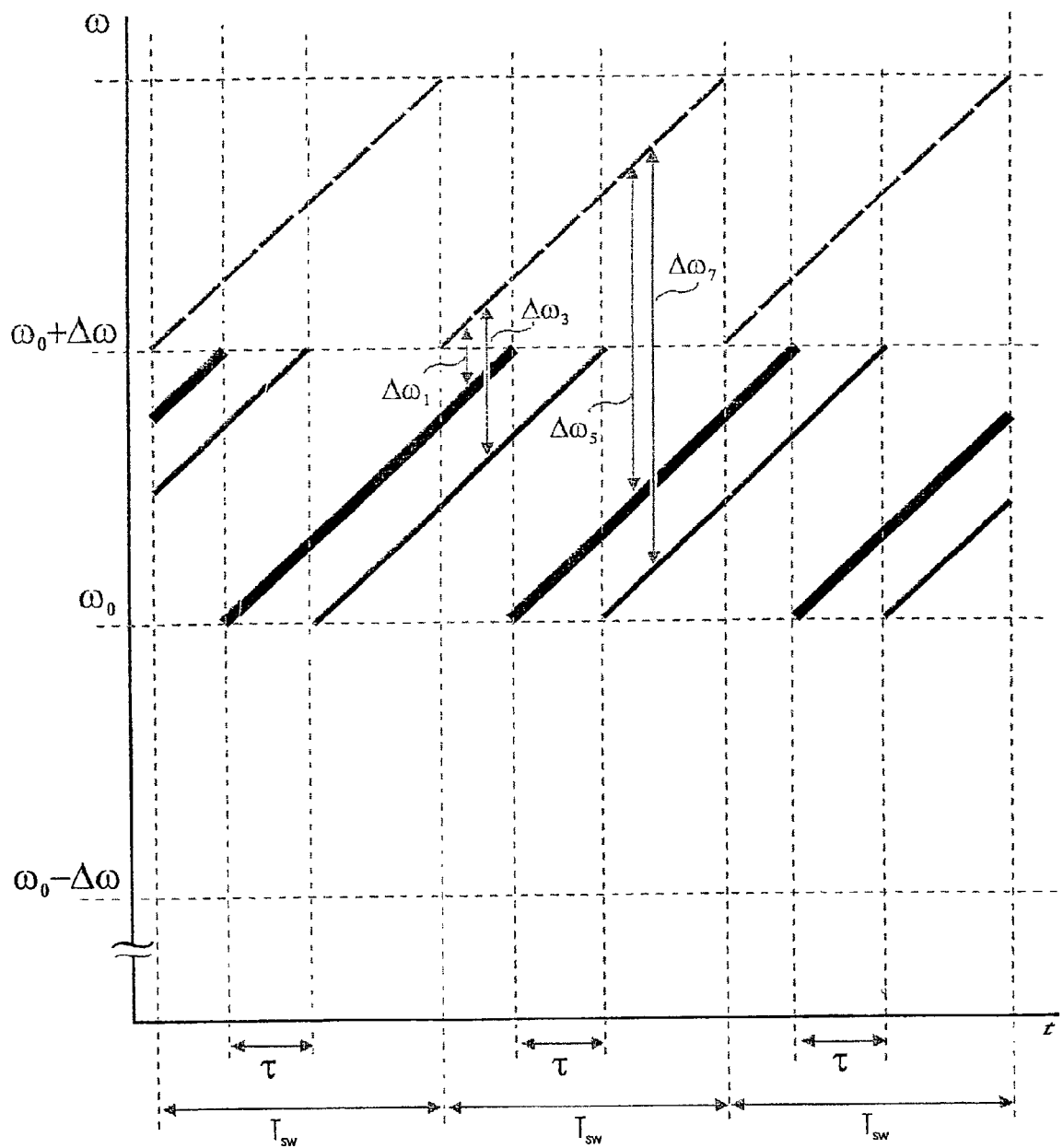
Figure 25:
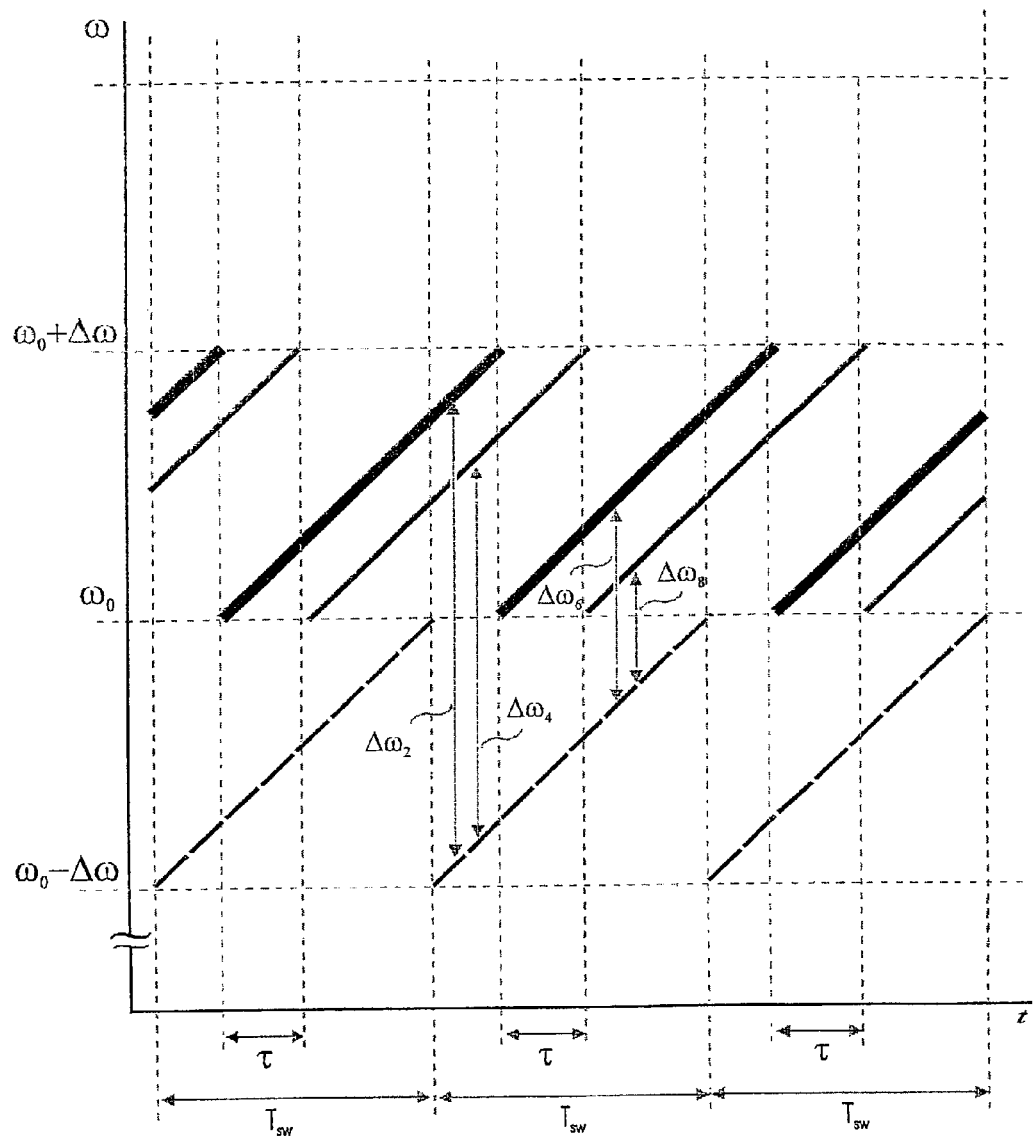
Figure 26A:
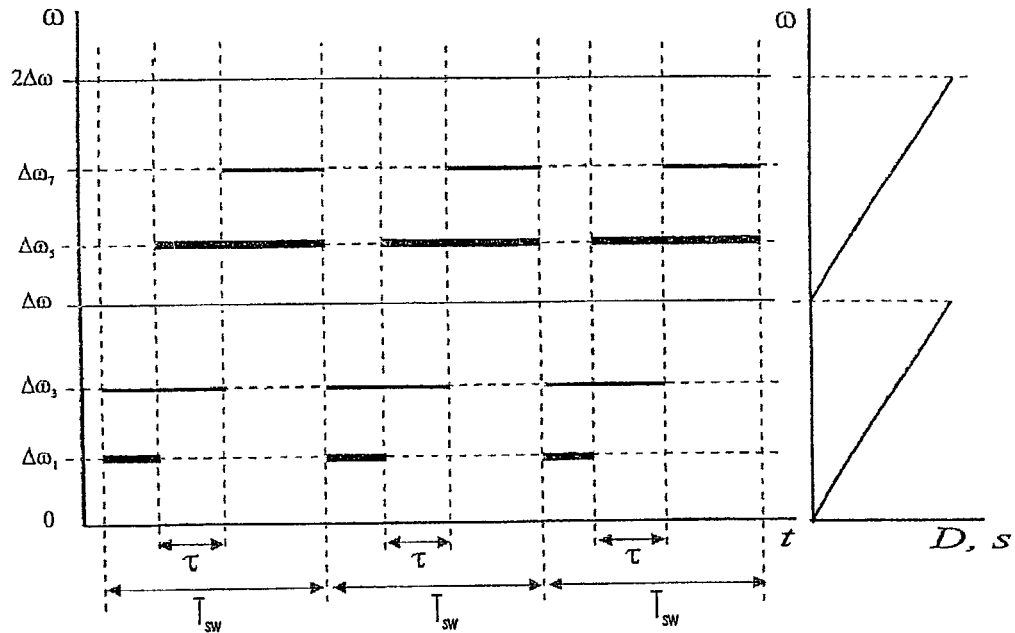
Figure 26B:
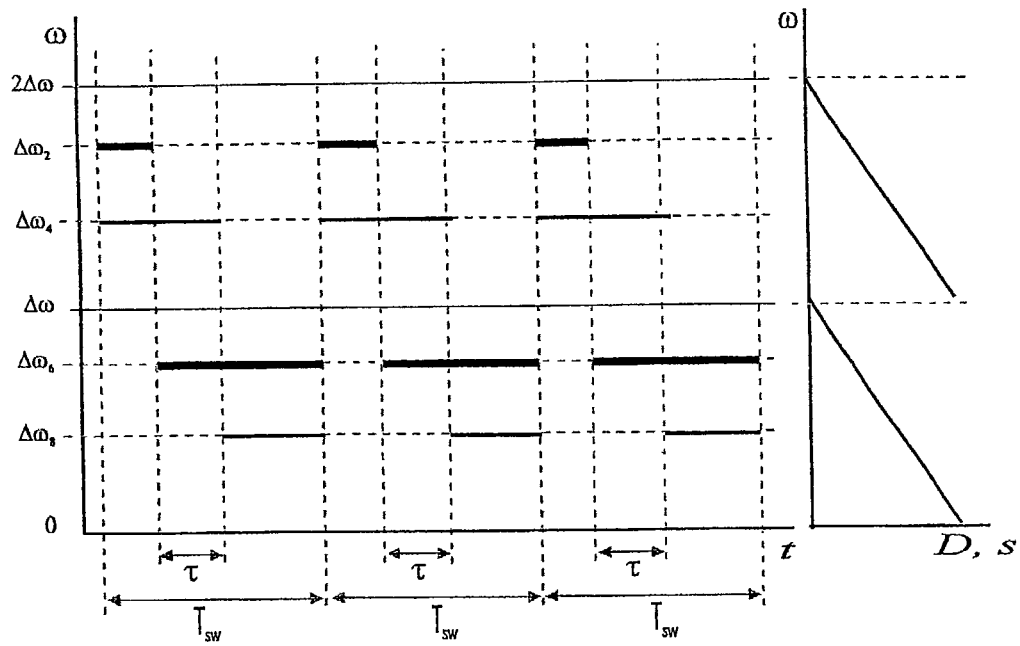
Figure 27A:
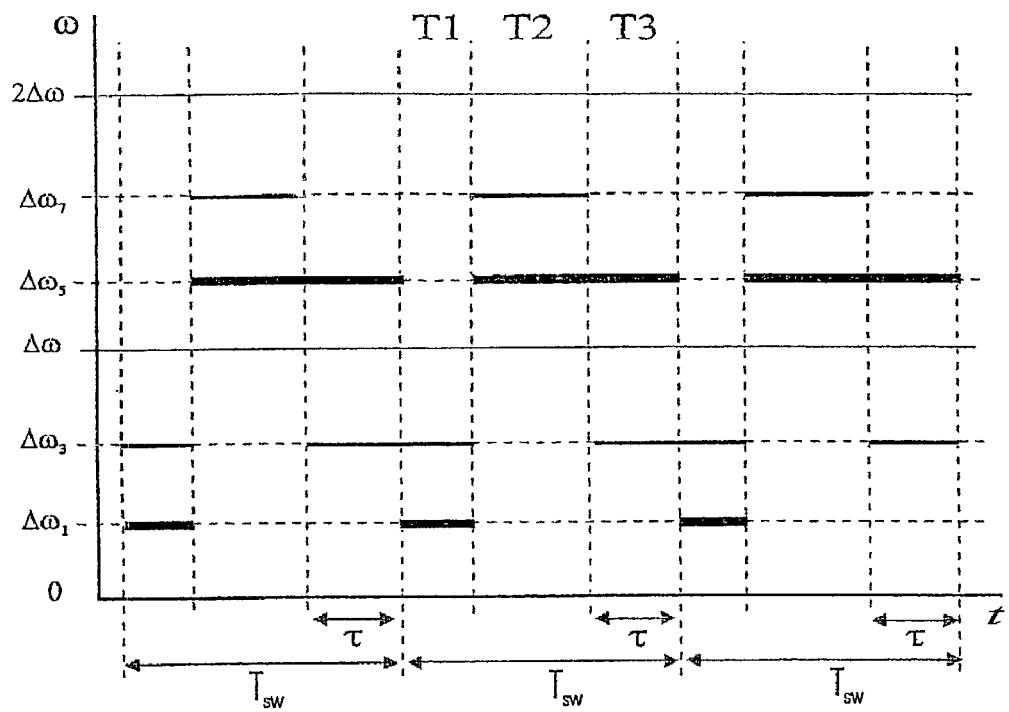
Figure 27B:
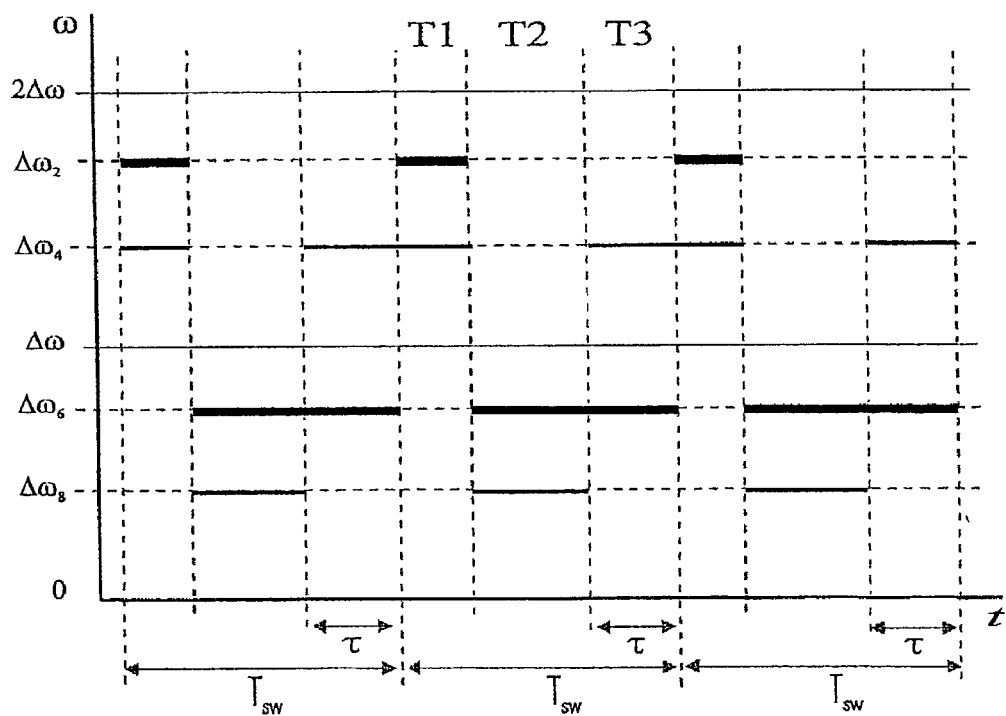
Figure 28:
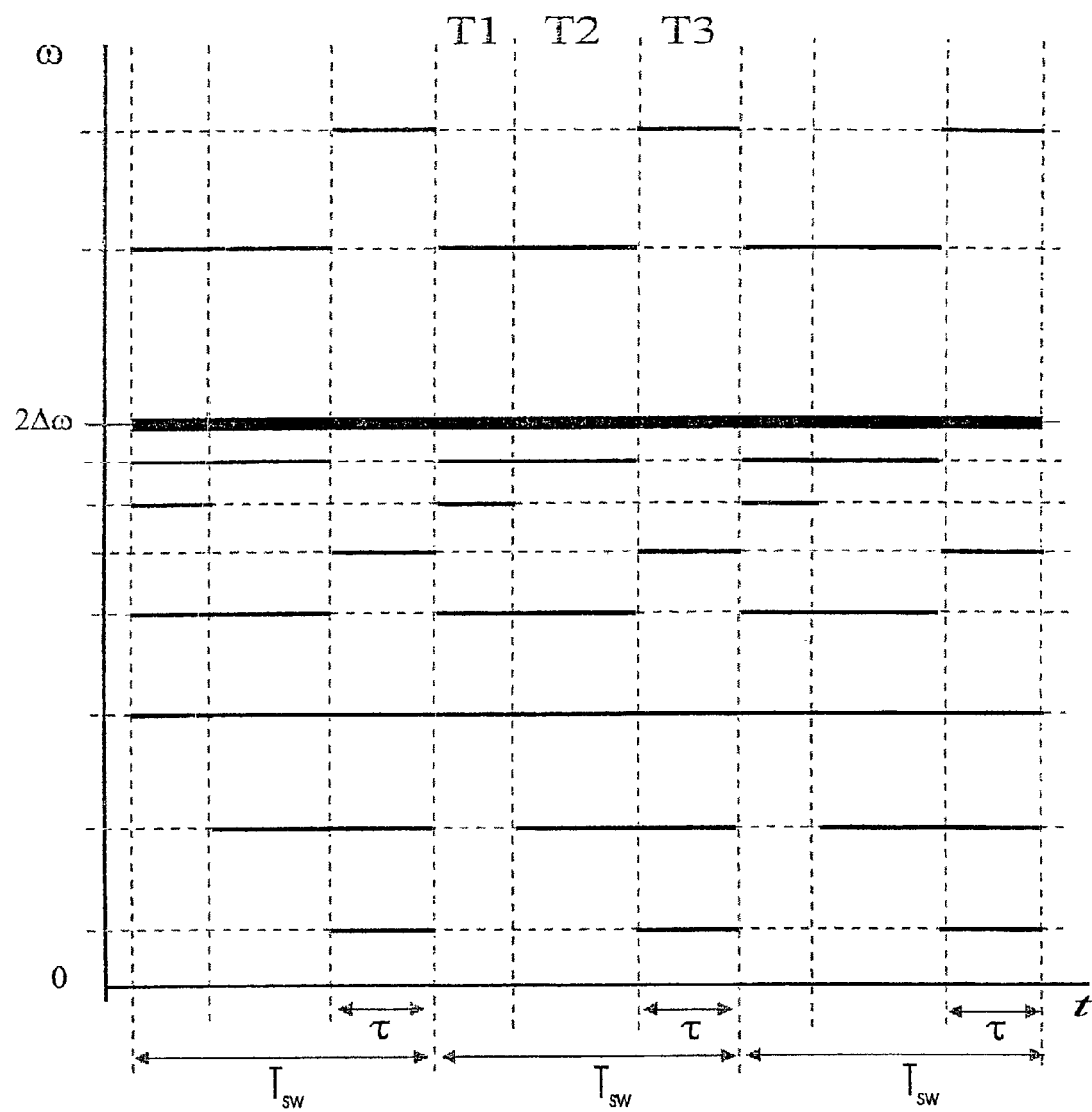
Figure 29A:
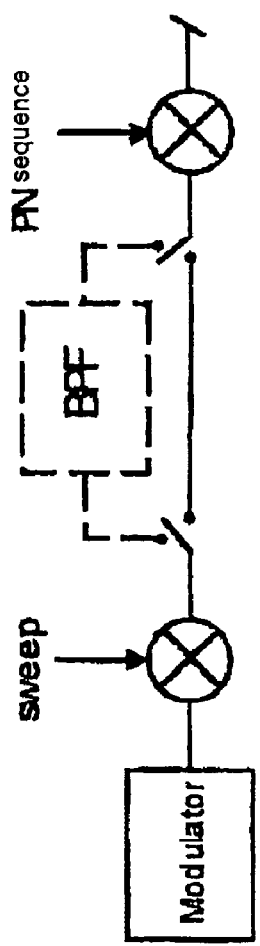
FIGS. 29 to 31 show other embodiments of receiving units according to the present invention which are configured to convert the abovedescribed PN method or to consider a Doppler shift.
Figure 29B:
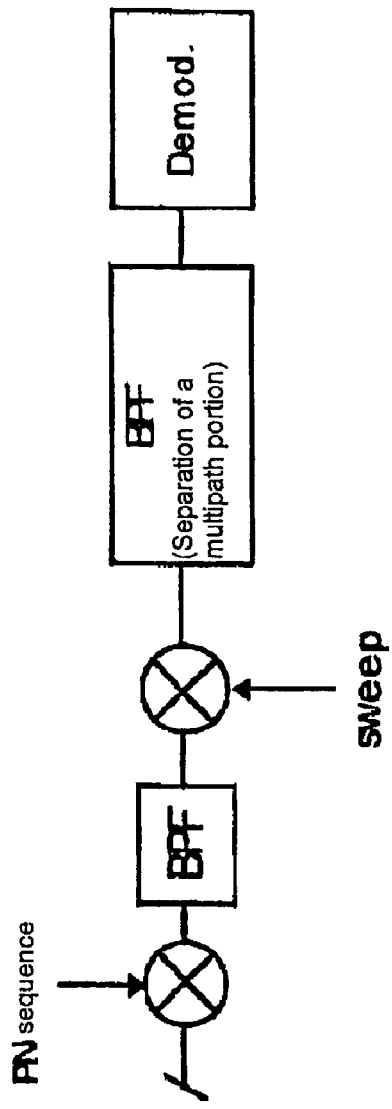
Figure 30:
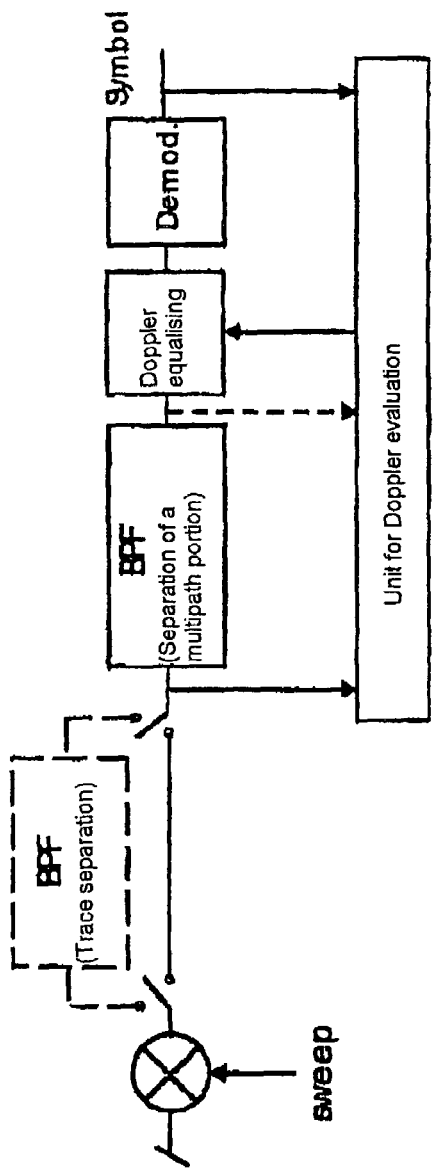
Figure 31:
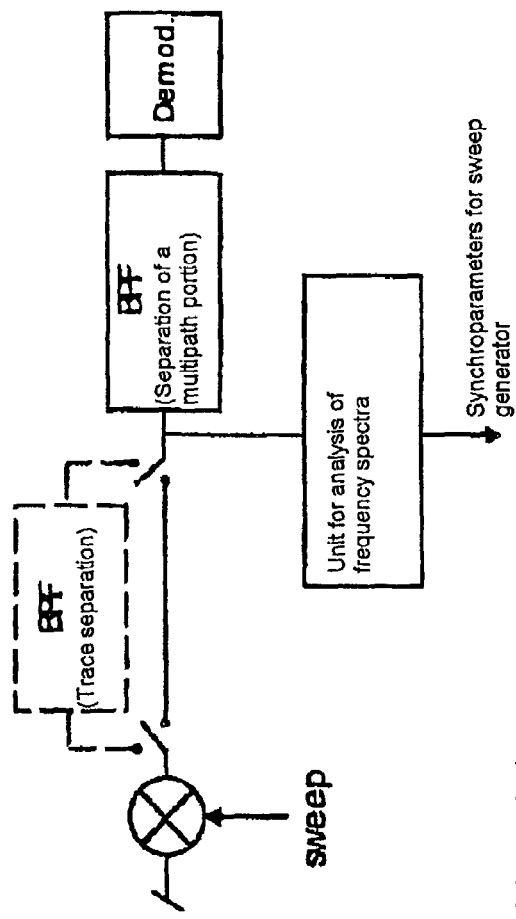

The application of the invention is not restricted to specific information content, coding methods, transmission techniques, transmission media or the like. For example, there is the possibility of applying the method for acoustic information transmission in particular by means of ultrasound through air (remote-control of electronic instruments, acoustic mouse, keyboard etc.) or also via other gaseous, liquid or solid media, for example under water, through solid bodies or via special sound conductors. Other applications are for example in radio traffic, in data transmission over laser beams or via electrically conductive or optic cables etc., in remote control (TV, keyboard) or under-water control, and in combined or also separate use for information transmission and/or for determining ambient information.

The features disclosed in the foregoing description, diagrams and claims of the invention can be of significance both individually and in any combination to realise the invention in its various configurations.

What is claimed is:

1. A method for transmitting and receiving information by means of waves, comprising the steps:

an information signal is attached to a carrier wave, whose frequency is continuously changed to form at least two carrier sweeps in a preset time interval, wherein the carrier wave is transmitted as a transmission signal without transmission of a reference signal, the frequency characteristic of the carrier sweeps with respect to frequency position, rise and form of the change in the carrier frequency from carrier sweep to carrier sweep is adapted to different transmission conditions or objects, wherein each carrier sweep carries one or more information units or bits, and the transmission signal is filtered after being received in the frequency range, in particular for separating multipath components or is cleaned of noise portions and is evaluated from itself with respect to information-carrying signal parameters.

2. The method as claimed in claim 1, wherein the information signal comprises a wave modulated in the analog method, preferably with a constant frequency, or another path, in particular with digital change of individual signal parameters or parameter combinations in the form of a phase modulation, an amplitude modulation or a frequency modulation dependent on the frequency characteristic of the carrier wave.

3. The method as claimed in claim 1 or 2, wherein the carrier sweeps are separated temporally, whereby the distances between the carrier sweeps are uniform or variable.

4. The method as claimed in claim 1, wherein during transmission the frequency position of the carrier sweeps is changed, in particular by switching to different frequency bands.

5. The method as claimed in claim 1, wherein the carrier sweeps are each broken down into n modulation time pulses (MTP) with specific modulations of the information signal, whereby n is a positive rational number, in particular a natural number greater than 1.

6. The method as claimed in claim 5, wherein the length of the modulation time pulses is changed continuously or gradually with respect to the frequency of the carrier wave.

7. The method as claimed in claim 1, wherein the information is coded in the form of the relative changes in the signal parameters between two different, in particular adjacent, time intervals or time pulses.

8. The method as claimed in claim 1, wherein in a given frequency band several modulated carrier sweeps are transmitted, which can overlap temporally, whereby these carrier sweeps belong to one information signal or different information signals.

9. The method as claimed in claim 1, wherein each carrier wave is broken down into two or more sections (intervals), with a different frequency characteristic, which temporally overlap or are also transmitted at the same time, whereby at least one of these sections is designed as a carrier sweep which in combination with a section having constant carrier frequency and/or with one or more carrier sweeps is transmitted with another, preferably counterrotating, rise and/or also another sweep form, whereby several sections encipher a symbol or also carry the same information and/or at least one of these sections can also be used as reference, whereby preferably for this part uniform modulation can then be carried out or also modulation can be completely dispensed with in terms of the information transmission.

10. The method as claimed in claims 8 or 9, wherein in a given frequency band at the same time one or more typically modulated carrier sweeps with varying time and/or frequency characteristic or also at the same time with one or more carrier waves of constant frequency are transmitted belonging to different information signals.

11. The method as claimed in claim 1, wherein the configuration of the carrier sweeps or carrier waves and their arrangement is established on one or more frequency bands in the form of a transmission protocol.

12. The method as claimed in claim 11, wherein the transmission protocol is altered during information transmission between sender and receiver in a predetermined agreed fashion or depending on transmitted information.

13. The method as claimed in claim 1, wherein the waves are formed as sound waves or as electromagnetic waves.

14. A method for sending information by means of waves, wherein a modulated carrier wave for carrying out a method as claimed in claim 1 is generated and emitted with a sending device.

15. A method for receiving information by means of waves, wherein a modulated carrier wave, which was transmitted as claimed in claim 1, is received and demodulated with a receiver.

16. The method as claimed in claim 15, wherein after receipt according to a time and/or frequency pattern of the carrier waves either predetermined or agreed on in the transmission protocol the portions to be assigned to a specific information signal or user are separated out from the received Signal.

17. The method as claimed in claim 15, wherein multiplication is carried out with a pseudo noise sequence after receipt in a processing step of the signal.

18. The method as claimed in claim 15, wherein the signal is transferred or transformed after receipt into another frequency form, in particular into a frequency band with constantly fixed carrier frequencies.

19. The method as claimed in claim 18, wherein each two or more frequency components are isolated from the spectrum of individual frequencies contained in the transformed signal, analysed separately from one another and the evaluation results are then compared or balanced, in particular by developing the average values from the respective signal parameters if necessary with weighting corresponding to the strength of the pertinent components.

20. The method as claimed in claim 18, wherein two or more frequency components are isolated from the spectrum of individual frequencies contained in the transformed signal and shifted relative to one another and frequency-transformed such that the carrier waves are coherent, then balanced with one another, in particular projected over one another or added and then evaluated, whereby the correction parameters contain information on the spatial-structural and physical nature of the transmission channel, which can undergo separate analysis.

21. The method as claimed in claim 15, wherein after receipt the signal is transferred to another frequency form by mixing or multiplication of the received signal with an artificially generated heterodyne frequency which has the same frequency response as the carrier wave of the transmitted signal, but which is preferably shifted parallel relative to this, so that the frequency of the carrier wave of the transformed signal is constantly fixed, or the frequencies of the portions of the pertinent spectrum remain constantly fixed.

22. The method as claimed in claim 15, wherein after receipt the signal is transferred to another frequency form by mixing or multiplication of the received signal with an artificially generated heterodyne frequency, which has a frequency response counter to the carrier wave of the transmitted signal, so that the frequency of the carrier wave of the transformed signal is constantly fixed, or the frequencies of the portions of the pertinent spectrum remain constantly fixed.

23. The method as claimed in any one of claims 18 or 22, wherein a Doppler frequency shift of the received signal is determined and observed during generation of the heterodyne frequency.

24. The method as claimed in claim 15, wherein each best suited frequency component, in particular the strongest received, is isolated out of the spectrum of the individual frequencies contained in the transformed signal, in particular as a result of multipath propagations, and if necessary is subjected to additional filtering in the time range, in particular by means of adaptive filters such as equalisers for example, or adaptive phase correction, in particular by means of PLL.

25. The method as claimed in claim 15, wherein the individual frequencies are evaluated by means of filter devices or on the basis of simple or complex FFT analysis or the signal parameters relevant for information coding are determined by means of projections on sine and cosine reference oscillation or by means of a scanning procedure.

26. The method as claimed in claim 15, wherein after receipt the signals are distributed with automatic signal recognition, wherein:
   A 1) the received signal is multiplied in two separate, typically parallel processing steps on the one hand with an artificially generated heterodyne frequency, which lies in a higher frequency band, and on the other hand is multiplied with a second heterodyne frequency which has the same or the precise opposite frequency characteristic compared to the first heterodyne frequency, but lies in a deeper frequency band, so that two spectra of the transformed signal arise, in which the frequency portions are depicted mirrored with respect to the central frequency of each spectrum, or
   A 2) a first spectrum of the transformed signal is generated by multiplication with only one artificially generated heterodyne frequency, in a higher or deeper frequency band, from which spectrum a second spectrum with internally mirrored frequency portions is then generated by multiplication with an accordingly deeper or higher constant heterodyne frequency, whereby
   B) in both spectra the respective spectral portions are synchronised by means of frequency-dependent time functions, in particular filters with non-linear phase characteristic, also phase-corrected if necessary to achieve coherency, and
   C) both spectra are multiplied with one another so that the diverse individual components in a given frequency cell are combined into a continuous wave which unites the main part of the signal energy in itself, and from here on can be filtered in the frequency range and analysed.

27. The method as claimed in claim 1, wherein the send signal and or the transformed send signal is reconstructed on the receiver side by demodulation and this artificially generated signal is evaluated with the received signal or its processing steps in order to extract information therefrom on the environment, in particular to determine positions and motion parameters, for spatial-structural and physical quality of the transmission channel, including information on its profile and objects contained therein which the send signal has absorbed in the process of sending via the transmission stretch.

28. The method as claimed in claim 1, wherein the sender receives images or components of the send signal reflected by the transmission channel or by boundaries or objects contained therein and balances these with the original send signal to extract information on the environment.

29. The method as claimed in one of claims 7 or 28, wherein the information on the respective properties and other nature of the transmission channel is considered with signal generation or signal distribution.

30. A sending device for sending waves carrying information according to a method in which the following steps are performed:
   an information signal is attached to a carrier wave, whose frequency is continuously changed to form at least two carrier sweeps in a preset time interval, wherein the carrier wave is transmitted as a transmission signal without transmission of a reference signal,
   the frequency characteristic of the carrier sweeps with respect to frequency position, rise and form of the change in the carrier frequency from carrier sweep to carrier sweep is adapted to different transmission conditions or objects, wherein each carrier sweep carries one or more information units or bits, and
   the transmission signal is filtered after being received in the frequency range, in particular for separating multipath components or is cleaned of noise portions and is evaluated from itself with respect to information-carrying signal parameters,
   the sending device comprising:
      at least one sender-side generator for generating carrier waves with at least one continuously flowing frequency change (carrier sweeps), a modulator for generating or coding an information signal, a mixer to modulate the information signals of the carrier wave and a send transformer, and if necessary a filter unit, in particular a bandpass filter unit (BPF) between the mixer and the send transformer.

31. The sending device as claimed in claim 30, which has a control module which controls the form, height and temporal sequence of the carrier, sweeps or the modulation of the information signal.

32. The sending device as claimed in claim 30 or 31, wherein several sender-side generators, modulators or mixers are provided which are connected in parallel and are interconnected via a central control module which controls the form, height and temporal sequence of the carrier sweeps, and if necessary also has a delay unit and a heterodyne unit, typically a summing integrator.

33. A sending device as claimed in claim 32, which has another modulation unit comprising at least one PN sequence generator and at least one multiplier.

34. The sending device as claimed in claim 32, which also has a processing unit, typically a correlation analyser, which is provided for determining environmental parameters from received signal components as compared to system-generated reference signals (reference signal).

35. The sending device as claimed in claim 32, which is configured as part of a system for transmission of information.

36. A sending device according to claim 30, further comprising a receiving device.

37. A receiving device for receiving signal waves carrying information and which were transmitted according to a method in which the following steps are performed:
   an information signal is attached to a carrier wave, whose frequency is continuously changed to form at least two carrier sweeps in a preset time interval, wherein the carrier wave is transmitted as a transmission signal without transmission of a reference signal,
   the frequency characteristic of the carrier sweeps with respect to frequency position, rise and form of the change in the carrier frequency from carrier sweep to carrier sweep is adapted to different transmission conditions or objects, wherein each carrier sweep carries one or more information units or bits, and
   the transmission signal is filtered after being received in the frequency range, in particular for separating multipath components or is cleaned of noise portions and is evaluated from itself with respect to information-carrying signal parameters, the receiving device comprising:
    a separator for separating signal components or multipath components in the frequency range, a projection device, in particular a multiplier or folding unit, and a demodulator or parameter analysis device.

38. The receiving device as claimed in claim 37, which also has a device for Doppler equalisation.

39. The receiving device as claimed in claim 37, which has between the separator and the demodulator or parameter analysis device an adaptive filter device which works in the time range and/or an adaptive phase correction device, and if necessary also another multiplier.

40. The receiving device as claimed in claim 37, which additionally has a device for analysing frequency spectra and for tuning, which is connected downstream of the projection device.

41. The receiving device as claimed in claim 37, which has one or more, preferably programmable, filter units with a special, typically non-linear phase characteristic (in English "phase response") or phase correction devices for processing frequency spectra, also a downstream mixer, and a filter unit and an equaliser, if required.

42. A receiving device for receiving signal waves carrying information and which were transmitted according to a method in which the following steps are performed:
    an information signal is attached to a carrier wave, whose frequency is continuously changed to form at least two carrier sweeps in a preset time interval, wherein the carrier wave is transmitted as a transmission signal without transmission of a reference signal,
    the frequency characteristic of the carrier sweeps with respect to frequency position, rise and form of the change in the carrier frequency from carrier sweep to carrier sweep is adapted to different transmission conditions or objects, wherein each carrier sweep carries one or more information units or bits, and
    the transmission signal is filtered after being received in the frequency range, in particular for separating multipath components or is cleaned of noise portions and is evaluated from itself with respect to information-carrying signal parameters,
    the receiving device comprising:
        a receiver-side generator for generating an artificial auxiliary frequency, a projection device, in particular a multiplier for heterodyning or multiplication with the receiving signal received from a receiving transformer, a separator for separating signal components or multipath components in particular in the frequency range, and a demodulator or parameter analysis device.

43. The receiving device as claimed in one of claims 37 or 42, which has two or more receiver-side generators or projection devices, in particular multipliers, separators or demodulator or parameter analysis devices which are connected in parallel and are interconnected via a central control module which controls signal processing according to a transmission protocol.

44. A system for transmission of information comprising:
at least one sending device and
at least one receiving device for receiving signal waves carrying information and which were transmitted according to a method in which the following steps are performed:
an information signal is attached to a carrier wave, whose frequency is continuously changed to form at least two carrier sweeps in a preset time interval, wherein the carrier wave is transmitted as a transmission signal without transmission of a reference signal,
the frequency characteristic of the carrier sweeps with respect to frequency position, rise and form of the change in the carrier frequency from carrier sweep to carrier sweep is adapted to different transmission conditions or objects, wherein each carrier sweep carries one or more information units or bits, and
the transmission signal is filtered after being received in the frequency range, in particular for separating multipath components or is cleaned of noise portions and is evaluated from itself with respect to information-carrying signal parameters,
the receiving device comprising:
a separator for separating signal components or multipath components in the frequency range, a projection device, in particular a multiplier or folding unit, and a demodulator or parameter analysis device.

45. A system for transmission of information comprising:
at least one sending device for sending waves carrying information according to a method in which the following steps are performed:
an information signal is attached to a carrier wave, whose frequency is continuously changed to form at least two carrier sweeps in a preset time interval, wherein the carrier wave is transmitted as a transmission signal without transmission of a reference signal,
the frequency characteristic of the carrier sweeps with respect to frequency position, rise and form of the change in the carrier frequency from carrier sweep to carrier sweep is adapted to different transmission conditions or objects, wherein each carrier sweep carries one or more information units or bits,
the transmission signal is filtered after being received in the frequency range, in particular for separating multipath components or is cleaned of noise portions and is evaluated from itself with respect to information-carrying signal parameters,
the sending device comprising:
at least one sender-side generator for generating carrier waves with at least one continuously flowing frequency change (carrier sweeps), a modulator for generating or coding an information signal, a mixer to modulate the information signals of the carrier wave and a send, transformer, and if necessary a filter unit, in particular a bandpass filter unit (BPF) between the mixer and the sender transformer, and
at least one receiving device.

* * * * *